US012655906B2

(12) United States Patent (10) Patent No.: US 12,655,906 B2
Han et al. (45) Date of Patent: Jun. 16, 2026

(54) SEALING DEVICE

(71) Applicant: NOK CORPORATION, Tokyo (JP)

(72) Inventors: Ruoyu Han, Fukushima (JP);
Masatoshi Seki, Fukushima (JP);
Junya Sugiyama, Fukushima (JP)

(73) Assignee: NOK CORPORATION (JP)

( * ) Notice: Subject to any disclaimer, the term of this
patent is extended or adjusted under 35
U.S.C. 154(b) by 0 days.

(21) Appl. No.: 18/738,397

(22) Filed: Jun. 10, 2024

(65) Prior Publication Data

US 2025/0243937 A1 Jul. 31, 2025

(30) Foreign Application Priority Data

Jan. 31, 2024 (JP) ................................. 2024-013781

(51) Int. Cl.
F16J 15/3244 (2016.01)
F16J 15/3232 (2016.01)
(52) U.S. Cl.
CPC ........ F16J 15/3244 (2013.01); F16J 15/3232
(2013.01)
(58) Field of Classification Search
CPC ............................ F16J 15/3232; F16J 15/3244
See application file for complete search history.

(56) References Cited

U.S. PATENT DOCUMENTS 3,504,920 A * 4/1970 Halliday .............. F16J 15/3244
277/560
3,895,814 A * 7/1975 Kupfert ................ F16J 15/3244
277/560

3,923,315 A * 12/1975 Hadaway ............. F16J 15/3244
277/560
3,934,888 A * 1/1976 Lutz ..................... F16J 15/3244
277/568
4,084,826 A 4/1978 Vossieck et al.
4,183,543 A * 1/1980 Antonini ............. F16J 15/3244
277/560

(Continued)

FOREIGN PATENT DOCUMENTS

CN 107461496 A 12/2017
DE 102013207029 A1 10/2014
JP 3278349 B2 4/2002

OTHER PUBLICATIONS

Extended European Search Report for corresponding European
Patent Application No. 24180864.1 dated Dec. 3, 2024 (10 Pages).

*Primary Examiner* — Nicholas L Foster
(74) *Attorney, Agent, or Firm* — Harness, Dickey &
Pierce, P.L.C.

(57) ABSTRACT

A sealing device 1 includes a reinforcing ring 10 and an
elastic body piece 20. A lip distal end portion 22 of a seal lip
21 of the elastic body piece 20 has a sealed-side surface 24
and an atmosphere-side surface 23 connected to each other
with a lip edge 22a in between. The atmosphere-side surface
23 is provided with a plurality of projecting structures 2
arranged side by side in a circumferential direction. The
projecting structures 2 each include a first projection 31 and
a second projection 32 adjacent in the circumferential direc-
tion. The first projection 31 is a projection for returning a
sealed object leaking during a rotation of a rotary shaft in a
normal rotation direction to a sealed-object side by a pump-
ing action. The second projection 32 is a projection for
returning the sealed object leaking during a rotation of the
rotary shaft in a reverse rotation direction to the sealed-
object side by the pumping action.

7 Claims, 14 Drawing Sheets

(56) References Cited

U.S. PATENT DOCUMENTS

| | | | | |
|---|---|---|---|---|
| 5,002,289 | A * | 3/1991 | Yasui | F16J 15/3244 |
| | | | | 277/559 |
| 6,276,691 | B1 * | 8/2001 | Nishigaki | F16J 15/3244 |
| | | | | 264/161 |
| 6,494,462 | B2 * | 12/2002 | Dietle | F16J 15/164 |
| | | | | 277/560 |
| 6,726,211 | B1 * | 4/2004 | Kuroki | F16J 15/3244 |
| | | | | 277/560 |
| 6,729,624 | B1 * | 5/2004 | Johnston | F16J 15/3244 |
| | | | | 277/560 |
| 9,133,938 | B2 * | 9/2015 | Hamamoto | F16J 15/3244 |
| 9,709,173 | B2 * | 7/2017 | Kurth | F16J 15/3244 |
| 10,228,059 | B2 * | 3/2019 | Hyakutake | F16J 15/3232 |
| 10,871,231 | B2 | 12/2020 | Honma | |
| 11,603,933 | B2 * | 3/2023 | Wunder | F16J 15/3268 |
| 11,773,980 | B2 * | 10/2023 | Manaka | F16J 15/3204 |
| | | | | 277/549 |

| | | | | |
|---|---|---|---|---|
| 11,913,552 | B2 * | 2/2024 | Ito | F16J 15/3232 |
| 2002/0163138 | A1 * | 11/2002 | Dietle | F16J 15/3244 |
| | | | | 277/559 |
| 2007/0057471 | A1 * | 3/2007 | Rentschler | F16J 15/324 |
| | | | | 277/559 |
| 2014/0312571 | A1 * | 10/2014 | Kurth | F16J 15/3244 |
| | | | | 277/559 |
| 2015/0097344 | A1 * | 4/2015 | Hamamoto | F16J 15/3244 |
| | | | | 277/550 |
| 2015/0115543 | A1 * | 4/2015 | Nakagawa | F16J 15/3244 |
| | | | | 277/559 |
| 2016/0252181 | A1 * | 9/2016 | Hyakutake | F16J 15/3232 |
| | | | | 277/559 |
| 2018/0119820 | A1 * | 5/2018 | Honma | F16J 15/3204 |
| 2020/0332898 | A1 * | 10/2020 | Wunder | F16J 15/3204 |
| 2021/0010599 | A1 * | 1/2021 | Yonai | F16J 15/3244 |
| 2022/0186838 | A1 * | 6/2022 | Manaka | F16J 15/3244 |
| 2023/0089005 | A1 * | 3/2023 | Ito | F16J 15/182 |
| | | | | 277/549 |

* cited by examiner

SEALING DEVICE

CROSS REFERENCE TO RELATED APPLICATIONS

The present application is based upon and claims the benefit of priority from Japanese Patent Application No. 2024-013781, filed on Jan. 31, 2024; the entire contents of which are incorporated herein by reference.

BACKGROUND

Technical Field

The present disclosure relates to a sealing device.

Background Art

Electric vehicles have recently developed a tendency to have an increased number of rotations of a motor shaft so as to reduce the size and weight of a drive unit. Moreover, in electric vehicles, the rotation directions of a motor for forward movement and backward movement are inverted for a structural reason.

In this regard, for an automobile, a general-purpose machine, or the like, an oil seal, i.e., a sealing device, has been used to seal a gap between a rotary shaft and a through hole of a housing in which the rotary shaft is inserted. The oil seal is designed to prevent leakage of an oil, i.e., a sealed object, into an atmosphere side from a sealed-object side in which the sealed object exists. Some of conventional oil seals include a plurality of screw projections arranged at regular intervals (see, for example, Japanese Patent No. 3278349). The plurality of screw projections produce an airflow from the atmosphere side toward the sealed-object side to exert a pumping action. The pumping action causes droplets of oil leaking into the atmosphere side over a lip distal end portion during a high-speed rotation of a rotary shaft to be pushed back to the sealed-object side by the pumping action.

In a case where a conventional oil seal is used on a rotary shaft that rotates in both a normal rotation direction and a reverse rotation direction as a shaft of a motor in an electric vehicle, screw projections may fail to exert a pumping action from an atmosphere side toward a sealed-object side when the rotary shaft rotates in the reverse rotation direction at high speed. Thus, there are cases where a sealed object, such as oil, leak into the atmosphere side along the screw projections when the rotary shaft rotates in the reverse rotation direction at high speed.

As seen from the above, there has been a demand for a sealing device to have a structure that makes it possible to prevent leakage of a sealed object such as oil even though the sealing device is used on a shaft that rotates in both a normal rotation direction and a reverse rotation direction at high speed.

The present disclosure is made in view of the above-described problem and an object of the present disclosure is to provide a sealing device that makes it possible to reduce leakage of a sealed object even though used on a shaft that rotates in both a normal rotation direction and a reverse rotation direction at high speed.

SUMMARY

In order to achieve the above-described object, a sealing device according to the present disclosure is to be used on a rotary shaft that rotates in one direction and an opposite direction and includes: an annular reinforcing ring around an axis; and an annular elastic body piece around the axis including a seal lip and attached to the reinforcing ring, the elastic body piece being made of an elastic body, in which the seal lip includes a lip distal end portion that is an annular portion projecting toward the axis, the lip distal end portion has a sealed-side surface and an atmosphere-side surface connected to each other with a lip edge in between, the sealed-side surface being an annular surface on a sealed-object side, the atmosphere-side surface being an annular surface on an atmosphere side, the atmosphere-side surface is provided with a plurality of projecting structures arranged side by side in a circumferential direction, the projecting structures each include a first projection and a second projection adjacent to each other in the circumferential direction, the first projection is a projection for returning the sealed object leaking during a rotation of the rotary shaft in the one direction back to the sealed-object side by a pumping action, and the second projection is a projection for returning the sealed object leaking during a rotation of the rotary shaft in the opposite direction back to the sealed-object side by a pumping action.

In the sealing device according to an aspect of the disclosure, the first projection extends from the sealed-object side toward the atmosphere side while being inclined to the opposite direction in the circumferential direction, and the second projection extends from the sealed-object side toward the atmosphere side while being inclined to the one direction in the circumferential direction.

In the sealing device according to an aspect of the disclosure, in each of the projecting structures, an end on the atmosphere side of the first projection is connected to an end on the atmosphere side of the second projection.

In the sealing device according to an aspect of the disclosure, a width in the circumferential direction between an end on the atmosphere side of the first projection and an end on the atmosphere side of the second projection in each of the projecting structures is narrower than a width in the circumferential direction between two of the projecting structures adjacent to each other.

In the sealing device according to an aspect of the disclosure, a width in the circumferential direction between the end on the atmosphere side of the first projection and the end on the atmosphere side of the second projection in each of the projecting structures is a width which is able to form, between the first projection and the second projection, a flow path through which the sealed object is to be returned to the sealed-object side during the rotation of the rotary shaft.

In the sealing device according to an aspect of the disclosure, in each of the projecting structures, the first projection and the second projection extend from the lip edge toward the atmosphere side.

In the sealing device according to an aspect of the disclosure, the plurality of projecting structures include a plurality of first projecting structures and a plurality of second projecting structures, and the plurality of second projecting structures are provided in such a manner that ends on the sealed-object side of the plurality of second projecting structures are on the atmosphere side in a direction of the axis with respect to ends on the sealed-object side of the plurality of first projecting structures and the plurality of second projecting structures are each provided between, out of the plurality of first projecting structures, the first projecting structures adjacent to each other in the circumferential direction.

In the sealing device according to an aspect of the disclosure, a height of the first projection and the second projection of each of the second projecting structures from the atmosphere-side surface is higher than a height of the first projection and second projection of each of the first projecting structures from the atmosphere-side surface.

In the sealing device according to an aspect of the disclosure, the plurality of projecting structures include a plurality of third projecting structures, and the plurality of third projecting structures are provided in such a manner that ends on the sealed-object side of the plurality of third projecting structures are on the atmosphere side in the direction of the axis with respect to ends on the sealed-object side of the plurality of second projecting structures and the plurality of third projecting structures are each provided between, out of the plurality of second projecting structures, the second projecting structures adjacent to each other in the circumferential direction.

In the sealing device according to an aspect of the disclosure, a height of the first projection and second projection of each of the third projecting structures from the atmosphere-side surface is higher than a height of the first projection and second projection of each of the second projecting structures from the atmosphere-side surface.

In the sealing device according to an aspect of the disclosure, the projecting structures each include a third projection extending from the sealed-object side toward the atmosphere side while being inclined to the opposite direction in the circumferential direction, and the third projection is connected to an end on the atmosphere side of the first projection.

Effect(s) of Disclosure

A sealing device according to the present disclosure makes it possible to reduce leakage of a sealed object even though used on a shaft that rotates in both a normal rotation direction and a reverse rotation direction at high speed.

DETAILED DESCRIPTION

Figure 1:
FIG. 1 is a cross-sectional view of a schematic configuration of a sealing device according to a first embodiment of the present disclosure.

Description will be made below on an embodiment of the present disclosure with reference to the drawings. It should be noted that in the drawings, a plurality of components are not all labeled with reference signs and the reference signs of a part of the plurality of components are omitted in some cases.

Figure 2:
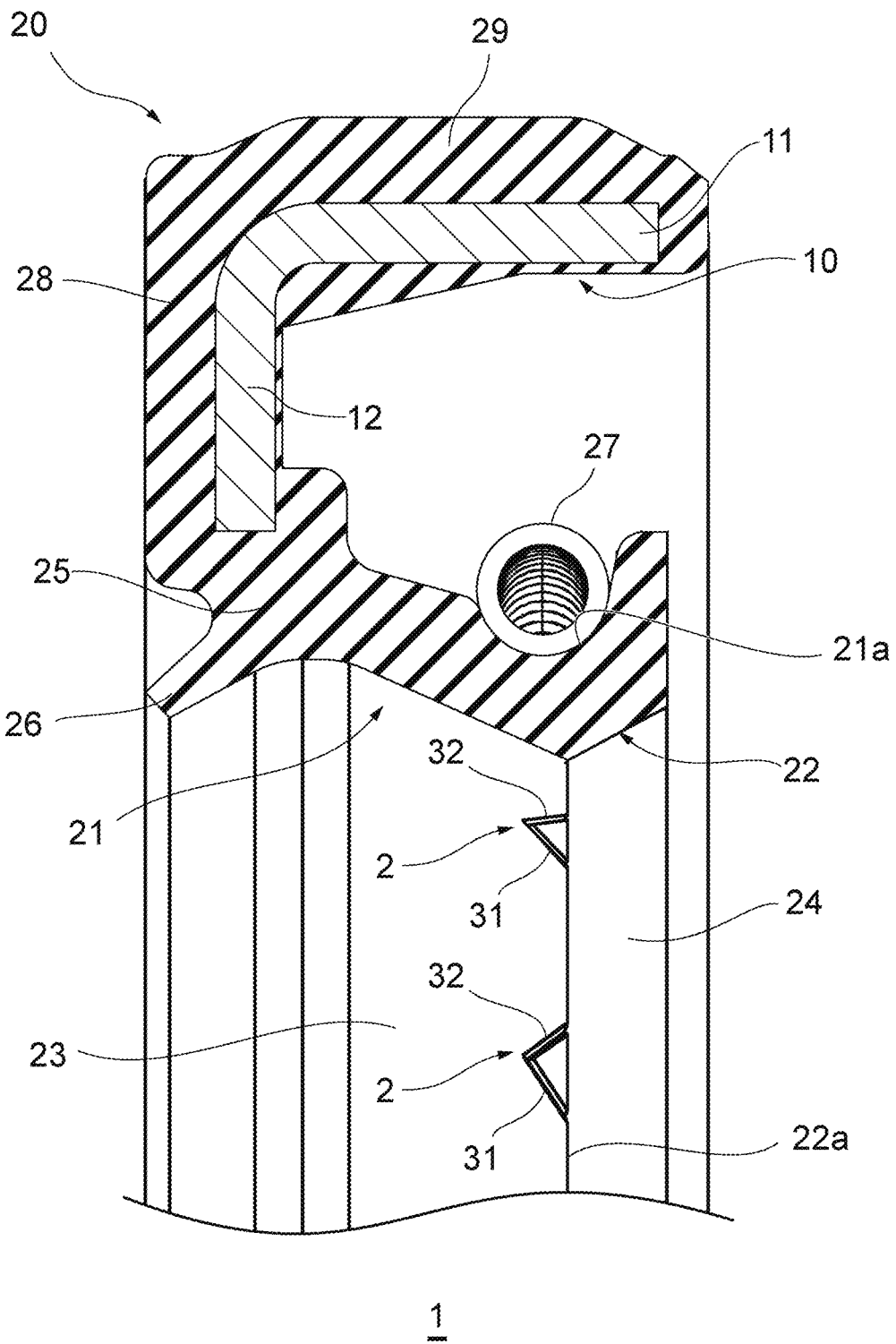
FIG. 2 is an enlarged cross-sectional view illustrating one side relative to an axis of the cross section illustrated in FIG. 1.
Figure 3:
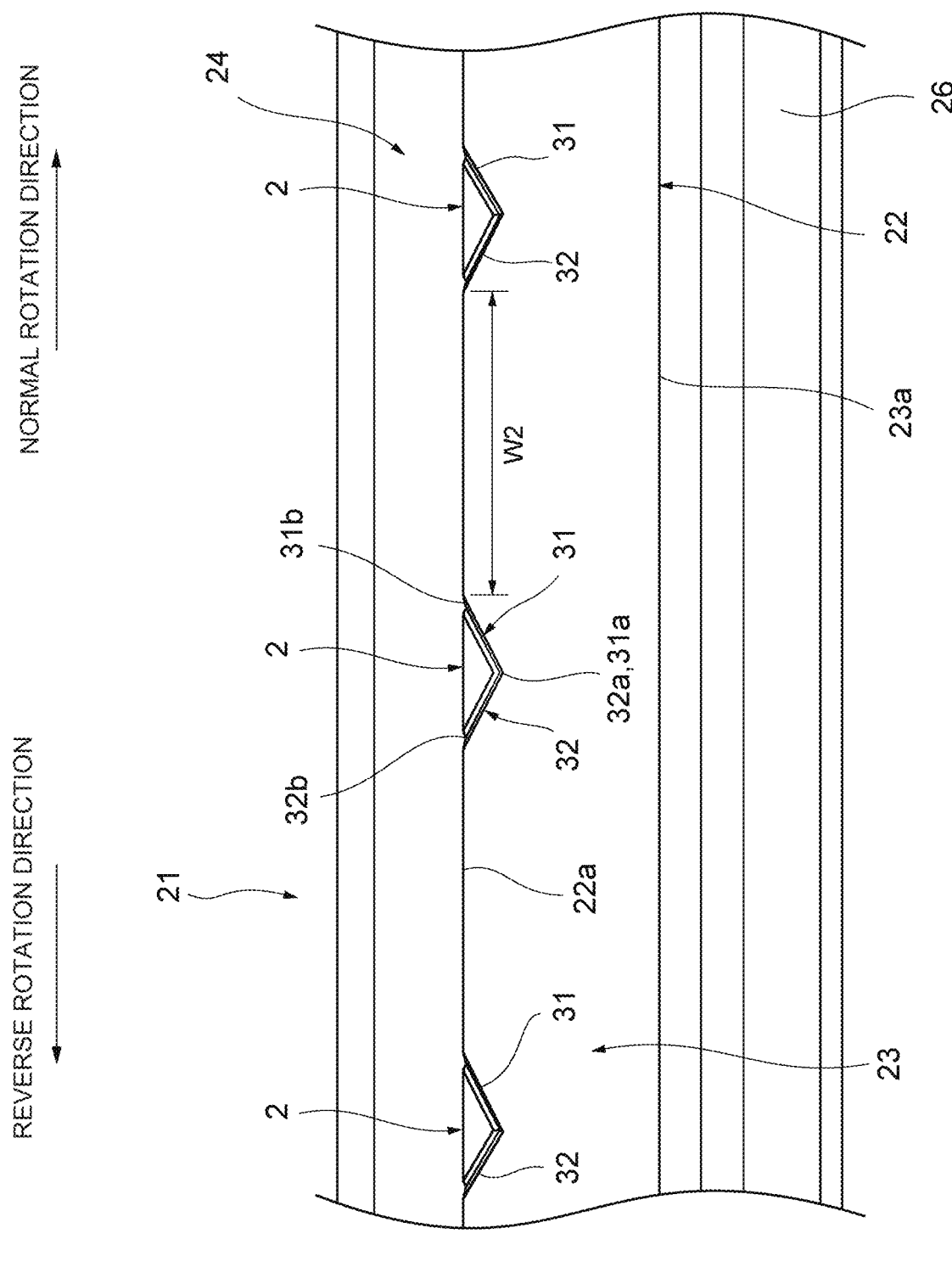
FIG. 3 is a partial enlarged view of a sealing device illustrated in FIG. 1.

FIG. 1 is a cross-sectional view of a schematic configuration of a sealing device 1 according to a first embodiment of the present disclosure and FIG. 2 is an enlarged cross-sectional view illustrating one side relative to an axis x of the cross section illustrated in FIG. 1. Moreover, FIG. 3 is a partial enlarged view of the sealing device 1. The sealing device 1 according to the first embodiment of the present disclosure is a sealing device that is to be used on a rotary shaft that rotates not only in a normal rotation direction which is one direction, but also in a reverse rotation direction which is an opposite direction. In an in-use state of being attached to an object in which the sealing device 1 is to be used, the sealing device 1 is in contact with an outer peripheral surface of the rotary shaft to seal a sealed object within a space for the sealed object to be sealed as described later. The sealing device 1 is to be used in, for example, a motor of an electric vehicle to seal a space between a rotary shaft as an output shaft, and a housing. It should be noted that an object in which the sealing device 1 is to be used is not limited to a motor of an electric vehicle.

As illustrated in FIGS. 1 to 3, the sealing device 1 includes a reinforcing ring 10 and an elastic body piece 20. The reinforcing ring 10 is an annular member around the axis x. The elastic body piece 20 is an annular member around the axis x that is made of an elastic body and the elastic body piece 20 includes a seal lip 21 and is attached to the reinforcing ring 10. The seal lip 21 includes a lip distal end portion 22 that is an annular portion projecting toward the axis x. The lip distal end portion 22 has a sealed-side surface 24 which is an annular surface on a sealed-object side, and an atmosphere-side surface 23 which is an annular surface on an atmosphere side. The sealed-side surface 24 is connected to the atmosphere-side surface 23 with the lip edge 22a in between. The atmosphere-side surface 23 is provided with a plurality of projecting structures 2 arranged side by side in a circumferential direction. The projecting structures 2 each have a first projection 31 and a second projection 32 that are adjacent in the circumferential direction. The first projection 31 is a projection for returning a sealed object leaking during a rotation of the rotary shaft in the normal rotation direction back to a sealed-object side by a pumping action. The second projection 32 is a projection for returning the sealed object leaking during a rotation of the rotary shaft in the reverse rotation direction back to the sealed-object side by a pumping action. A specific description will be made below on a configuration of the sealing device 1.

It should be noted that the axis x is a center axis of the sealing device 1. Moreover, the sealed-object side is a side in which the sealed object such as oil is desired to be present. The sealed-object side is a side indicated by an arrow-a direction along the axis-x direction as illustrated in FIG. 1. Moreover, the atmosphere side is a side near an atmosphere and in which no sealed object is desired to be present. The atmosphere side is a side indicated by an arrow-b direction along the axis-x direction as illustrated in FIG. 1. Moreover, a direction orthogonal to the axis-x direction is referred to as a radial direction, a side toward the axis x in the radial direction is referred to as an inner peripheral side, and a side away from the axis x in the radial direction is referred to as an outer peripheral side.

The reinforcing ring 10 is, for example, a circular or substantially circular member around or substantially around the axis x. The reinforcing ring 10 includes a cylinder 11 which is a cylindrical portion extending along the axis x, and a flange 12 which is an annular portion stretching from an end on the atmosphere side of the cylinder 11 toward the inner peripheral side, as illustrated in, for example, FIGS. 1 and 2. The reinforcing ring 10 is made of, for example, metal. Examples of a metal material of the reinforcing ring 10 include stainless steel and steel plate cold commercial (SPCC). It should be noted that the material of the reinforcing ring 10 is not limited to metal.

The elastic body piece 20 is attached to the reinforcing ring 10. For example, the elastic body piece 20 is attached to the reinforcing ring 10 to cover the reinforcing ring 12 from the atmosphere side and the outer peripheral side as illustrated in, for example, FIGS. 1 and 2. The elastic body piece 20 is reinforced by the reinforcing ring 10. The elastic body piece 20 includes the elastic body as described above. The elastic body for the elastic body piece 20 is exemplified by various rubber materials. Examples of the various rubber materials include synthetic rubbers such as nitrile rubber (NBR), hydrogenated nitrile rubber (H-NBR), acrylic rubber (ACM), and fluorine rubber (FKM). The elastic body piece 20 is, for example, bonded to the reinforcing ring 10.

The elastic body piece 20 includes the seal lip 21 and the seal lip 21 has the lip distal end portion 22 which is an annular portion projecting toward the axis x, on an inner peripheral side thereof as described above. The elastic body piece 20 also includes a lip waist 25 as illustrated in FIGS. 1 and 2. The lip waist 25 is an annular portion of the elastic body piece 20 located near an inner peripheral end of the flange 12 of the reinforcing ring 10. The seal lip 21, at an end on the atmosphere side thereof, is connected to the lip waist 25 and extends inward from the lip waist 25. The seal lip 21 is opposed to a cylinder 11 of the reinforcing ring 10. The elastic body piece 20 also includes a dust lip 26. The dust lip 26 extends from the lip waist 25 toward the atmosphere side and the axis x.

Specifically, the lip distal end portion 22 of the seal lip 21 is, for example, a circular or substantially circular portion around or substantially around the axis x and is formed at an end on the sealed-object side of the seal lip 21 as illustrated in FIGS. 1 and 2. A cross section of the lip distal end portion 22 is in a shape of a wedge projecting toward the inner peripheral side. The lip distal end portion 22 is formed to be in contact with the outer peripheral surface of the rotary shaft at the lip edge 22a on the inner peripheral side and a portion near the lip edge 22a when being in a later-described in-use state. More specifically, an interference of the lip distal end portion 22 relative to the rotary shaft is set so that the lip distal end portion 22 comes into contact with the outer peripheral surface of the rotary shaft over a predetermined width including the lip edge 22a in the axis-x direction.

The lip distal end portion 22 is defined by the annular atmosphere-side surface 23 on the atmosphere side and the annular sealed-side surface 24 on the sealed-object side that are connected to each other with the lip edge 22a in between as illustrated in FIGS. 1 and 2. The atmosphere-side surface 23 is a surface facing the atmosphere side and a tapered surface in a conical shape or substantially in a conical shape that increases in diameter as becoming closer to the atmosphere side (the arrow-b direction) in the axis-x direction. The sealed-side surface 24 is a surface facing the sealed-object side and a tapered surface in a conical shape or substantially in a conical shape that increases in diameter as becoming closer to an inner side (the arrow-a direction) in the axis-x direction.

The atmosphere-side surface 23 and the sealed-side surface 24 intersect each other at respective small-diameter sides and the lip edge 22a is formed at an intersecting portion. The lip edge 22a is in a circle or substantially in a circle around or substantially around the axis x in a cross section orthogonal to the axis x and is a portion at the innermost peripheral position in the lip distal end portion 22.

As illustrated in FIGS. 1 and 2, a recess 21a is formed in an outer peripheral portion of the seal lip 21 opposite the lip distal end portion 22 and a garter spring 27 is fitted in the recess 21a. The garter spring 27 is, for example, a metallic spring member. In the later-described in-use state, the garter spring 27 presses the lip distal end portion 22 of the seal lip 21 toward an inner periphery in the radial direction to apply a tensioning force having a predetermined magnitude relative to the outer peripheral surface of the rotary shaft to the lip distal end portion 22.

As illustrated in FIGS. 1 and 2, the dust lip 26 is a portion extending from the lip waist 25 to the atmosphere side (the arrow-b direction) and the inner peripheral side and toward the axis x. In the later-described in-use state, the dust lip 26 is designed to block the entry of foreign matters such as muddy water, sand, and dust toward the lip distal end portion 22 from the atmosphere side.

The elastic body piece 20 also includes a rear cover 28 and a gasket 29 as illustrated in FIGS. 1 and 2. The rear cover 28 is a portion covering the flange 12 of the reinforcing ring 10 from the atmosphere side and the gasket 29 is a portion covering the cylinder 11 of the reinforcing ring 10 from an outer peripheral side of the cylinder 11. The gasket 29 is a portion for fixing the sealing device 1 in a through hole of a member, such as a housing, through which the rotary shaft penetrates in the in-use state. When the sealing device 1 is attached to the above-described through hole, the gasket 29 is compressed in the radial direction between the through hole and the cylinder 11 of the reinforcing ring 11 to generate a force toward the radial direction, namely, a fitting force. A thickness of the gasket 29 in the radial direction is set so that a fitting force having a predetermined magnitude is generated when the sealing device 1 is attached to the through hole. The elastic body piece 20 includes the portions as described above, namely, the seal lip 21, the lip waist 25, the dust lip 26, the rear cover 28, and the gasket 29, and is integrally formed from the same elastic body.

As described above, the atmosphere-side surface 23 of the lip distal end portion 22 is provided with the plurality of projecting structures 2 arranged side by side in the circumferential direction. In the sealing device 1, the plurality of projecting structures 2 are, by way of example, lined in the circumferential direction as illustrated in FIGS. 1 to 3. The plurality of projecting structures 2 are provided along, for example, a circle around the axis x at regular angular intervals or substantially at regular angular intervals around the axis x. It should be noted that FIG. 3, in which the elastic body piece 20 is viewed from the inner peripheral side, illustrates the lip distal end portion 22 and a nearby part.

As illustrated in FIGS. 2 and 3, the projecting structures 2 each include the first projection 31 and the second projection 32. In the in-use state, the first projection 31, or screw projection, exerts the pumping action during a rotation of the rotary shaft in the normal rotation direction to return a sealed object leaking into the atmosphere side over the lip edge 22*a* back to the sealed-object side over the lip edge 22*a*. In the in-use state, the second projection 32, or screw projection, exerts the pumping action during a rotation of the rotary shaft in the reverse rotation direction to return a sealed object leaking into the atmosphere side over the lip edge 22*a* back to the sealed-object side over the lip edge 22*a*. Moreover, in the in-use state, the first projection 31 exerts the pumping action during the rotation of the rotary shaft in the normal rotation direction to return the sealed object leaking along the second projection 32 into the atmosphere side over the lip edge 22*a* back to the sealed-object side over the lip edge 22*a*. Likewise, in the in-use state, the second projection 32 exerts the pumping action during the rotation of the rotary shaft in the reverse rotation direction to return the sealed object leaking along the first projection 31 into the atmosphere side over the lip edge 22*a* back to the sealed-object side over the lip edge 22*a*. In the in-use state, the projecting structure 2 also temporarily holds back and retains the sealed object leaking into the atmosphere side over the lip edge 22*a* during a rotation of the rotary shaft.

As illustrated in FIGS. 2 and 3, the first projection 31 is a projection projecting from the atmosphere-side surface 23, and extends from the sealed-object side toward the atmosphere side while being inclined in the reverse rotation direction. That is to say, the first projection 31 obliquely extends toward the atmosphere side while being inclined in the reverse rotation direction with respect to the lip edge 22*a* of the lip distal end portion 22. An end on the atmosphere side, namely, an outer end 31*a*, of the first projection 31 is thus located at a distance from an end on the sealed-object side, namely, an inner end 31*b*, toward the reverse rotation direction along the circumferential direction. In the in-use state, the first projection 31 generates airflow directed toward the sealed-object side from the atmosphere side along the first projection 31 during a normal rotation of the rotary shaft.

The first projection 31 extends from the lip edge 22*a* and the inner end 31*b* of the first projection 31 is located on the lip edge 22*a* as illustrated in, for example, FIGS. 2 and 3. Moreover, the first projection 31 does not reach an edge on the atmosphere side of the atmosphere-side surface 23, namely, an outer periphery 23*a*, as illustrated in, for example, FIGS. 2 and 3. The outer end 31*a* of the first projection 31 is located at a position spaced in the axis-x direction from the lip edge 22*a* toward the atmosphere side by a predetermined distance. The first projection 31 extends from the lip edge 22*a* to the position spaced in the axis-x direction on the atmosphere surface 23 by the predetermined distance.

Figure 4:
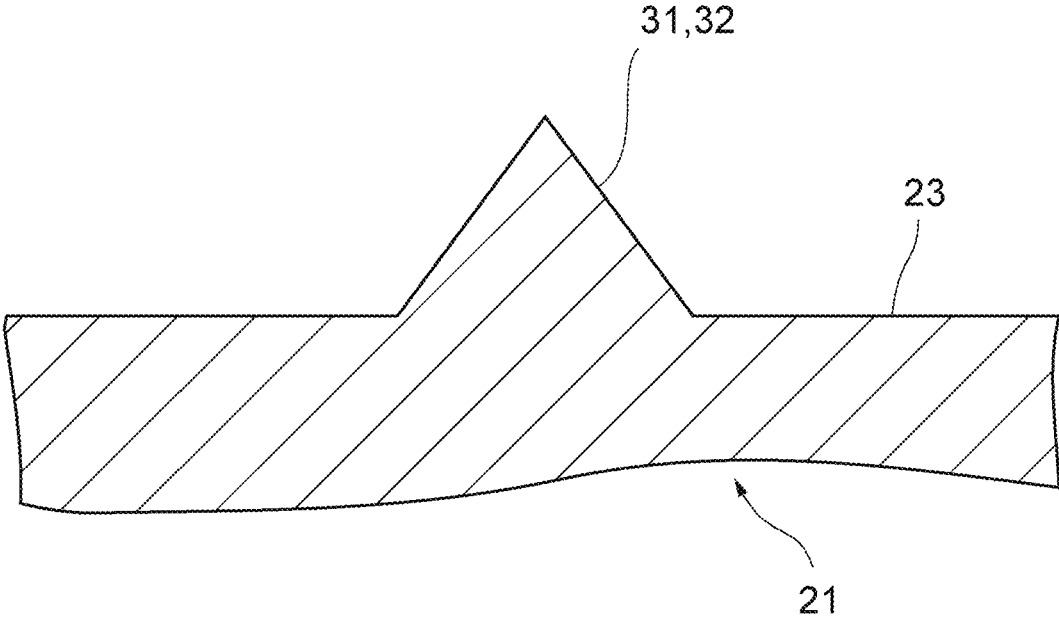
FIG. 4 is a cross-sectional view illustrating a shape of a cross section orthogonal to extending directions of a first projection and a second projection.

FIG. 4 is a cross-sectional view illustrating a shape of a cross section (hereinafter, also referred to as cross-sectional shape) orthogonal to an extending direction of the first projection 31. The first projection 31 is in or substantially in a shape of a triangle protruding toward the inner peripheral side as illustrated in FIG. 4. A cross-sectional shape of the first projection 31 is specifically, for example, an equilateral triangle or a substantial equilateral triangle as illustrated in FIG. 4. The cross-sectional shape of the first projection 31 is not limited to the above and may be an isosceles triangle or any other triangle or substantial triangle. Moreover, the cross-sectional shape of the first projection 31 is not limited to a triangle and may be a quadrangle or any other polygon. Alternatively, the first projection 31 may have a cross section having an outline including a circular arc or an arc, an outline including a curve, a cross section having an outline including a line formed by a combination of a plurality of straight lines, a cross section having an outline including a line formed by a combination of a single or a plurality of curves with a single or a plurality of straight lines, or the like. It is preferable that the cross-sectional shape of the first projection 31 be a shape symmetric with respect to a line orthogonal to the atmosphere-side surface 23, such as an equilateral triangle or an isosceles triangle.

Figure 5:
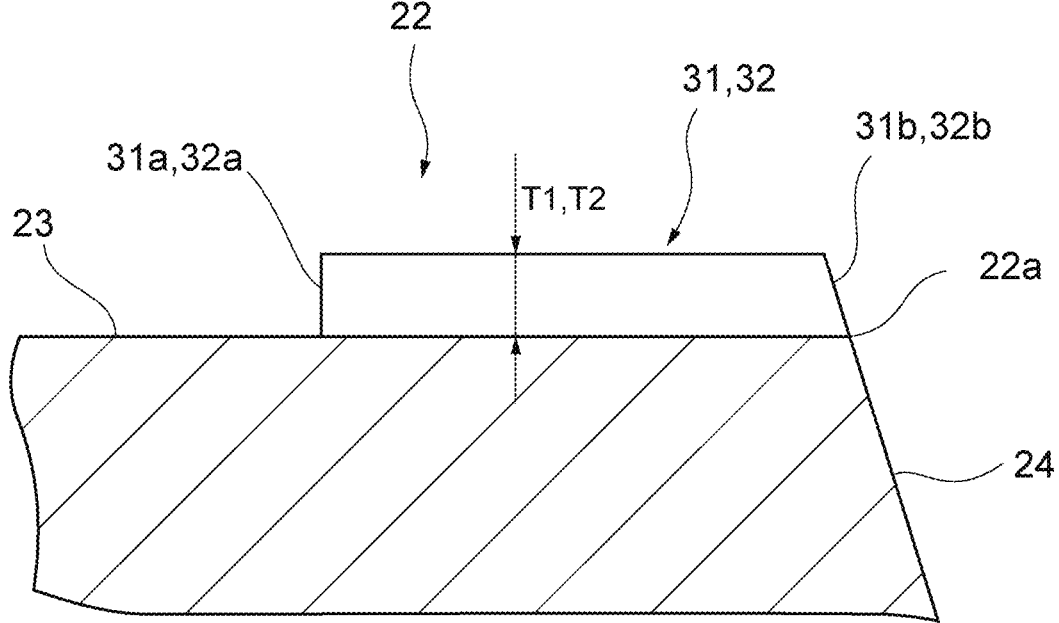
FIG. 5 is a partial enlarged cross-sectional view where the first projection and the second projection of the sealing device illustrated in FIG. 1 are viewed in a circumferential direction.
Figure 6:
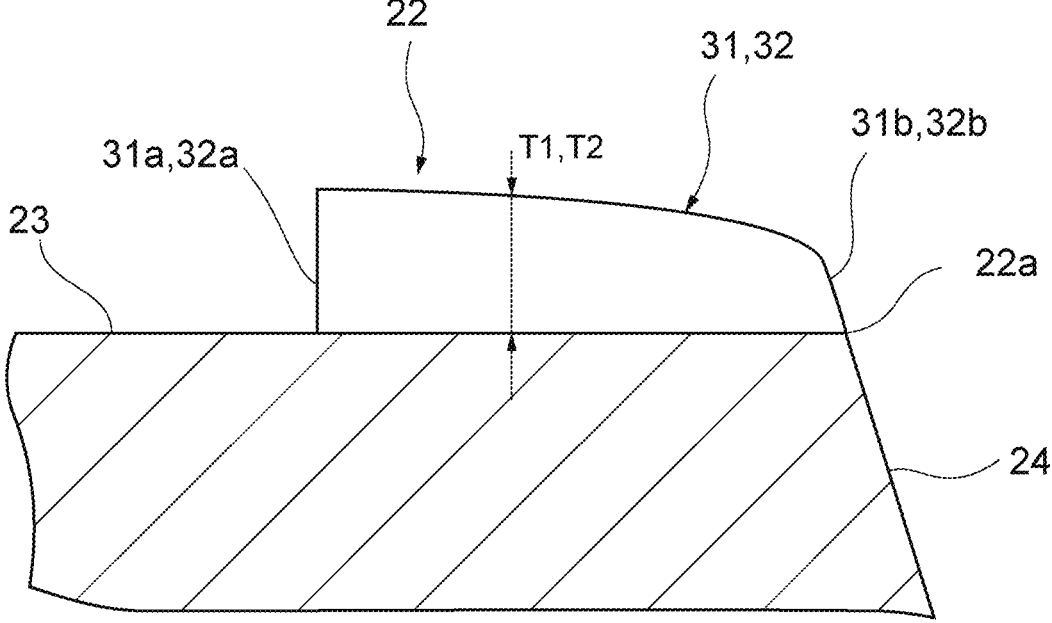
FIG. 6 is a partial enlarged cross-sectional view where a modification example of the first projection and the second projection of the sealing device illustrated in FIG. 1 is viewed in the circumferential direction.

The first projection 31 is, by way of example, a parallel projection as illustrated in FIG. 5 and a height T1 of the first projection 31 is constant or substantially constant throughout the entire first projection 31. It should be noted that FIG. 5 is a partial enlarged cross-sectional view where the first projection 31 is viewed in the circumferential direction. FIG. 6 illustrates a modification example of the first projection 31 and is a partial enlarged cross-sectional view where the modification example of the first projection 31 is viewed in the circumferential direction. The first projection 31 may be a ship-bottom projection as illustrated in, for example, FIG. 6. In this case, the height T1 of the first projection 31 is not constant throughout the entire first projection 31 but increases from the inner end 31*b* toward the outer end 31*a*. Additionally, the height T1 of the first projection 31 may increase from the inner end 31*b* toward the outer end 31*a* to a predetermined position and decrease from the predetermined position. It should be noted that the height T1 of the first projection 31 is the amount of protrusion from the atmosphere-side surface 23, a distance from the atmosphere-side surface 23 in a direction orthogonal to the atmosphere-side surface 23.

The second projection 32 is a projection extending while being inclined oppositely to the first projection 31. The second projection 32 has, for example, the same or substantially the same shape and size as the first projection 31. As illustrated in FIGS. 2 and 3, the second projection 32 is a projection projecting from the atmosphere-side surface 23, and extends from the sealed-object side toward the atmosphere side while being inclined in the normal rotation direction. That is to say, the second projection 32 obliquely extends toward the atmosphere side while being inclined in the normal rotation direction with respect to the lip edge 22*a* of the lip distal end portion 22. An end on the atmosphere side, namely, an outer end 32*a*, of the second projection 32 is thus located at a distance from an end on the sealed-object side, namely, an inner end 32*b*, toward the normal rotation direction along the circumferential direction. In the in-use state, the second projection 32 generates airflow directed toward the sealed-object side from the atmosphere side along the second projection 32 during a reverse rotation of the rotary shaft.

The second projection 32 extends from the lip edge 22*a* and the inner end 32*b* of the second projection 32 is located on the lip edge 22*a* as illustrated in, for example, FIGS. 2 and 3. Moreover, the second projection 32 does not reach the outer periphery 23*a* of the atmosphere-side surface 23 as illustrated in, for example, FIGS. 2 and 3. The outer end 32*a* of the second projection 32 is located at a position spaced in the axis-x direction from the lip edge 22*a* toward the atmosphere side by a predetermined distance. The second projection 32 extends from the lip edge 22*a* to the position spaced in the axis-x direction on the atmosphere surface 23 by the predetermined distance.

A cross-sectional shape of the second projection 32 is the same or substantially the same as the cross-sectional shape of the first projection 31 as illustrated in FIG. 4. Moreover, the second projection 32 is, by way of example, a parallel projection as illustrated in FIG. 5 and a height T2 of the second projection 32 is constant or substantially constant throughout the entire second projection 32. The second projection 32 may be a ship-bottom projection as illustrated in, for example, FIG. 6. In this case, the height T2 of the second projection 32 is not constant throughout the entire second projection 32 but increases from the inner end 32*b* toward the outer end 32*a*. Additionally, the height T2 of the second projection 32 may increase from the inner end 32*b* toward the outer end 32*a* to a predetermined position and decrease from the predetermined position. For example, a shape and size of the second projection 32 may be the same or substantially the same as the shape and size of the first projection 31. The height T2 of the second projection 32 is also the same or substantially the same as the height T1 of the first projection 31. It should be noted that the height T2 of the second projection 32 is the amount of protrusion from the atmosphere-side surface 23, and a distance from the atmosphere-side surface 23 in a direction orthogonal to the atmosphere-side surface 23.

In the projecting structure 2, the outer end 31*a* of the first projection 31 is connected to the outer end 32*a* of the second projection 32 as illustrated in FIGS. 2 and 3. That is to say, the outer end 31*a* of the first projection 31 overlaps the outer end 32*a* of the second projection 32. The projecting structure 2 is thus a V-shaped projection.

The inner end 31*b* of the first projection 31 and the inner end 32*b* of the second projection 32 are located on the lip edge 22*a*. In the in-use state, the lip edge 22*a*, which is in contact with the rotary shaft, is lifted from the outer peripheral surface of the rotary shaft near the inner end 31*b* of the first projection 31 and near the inner end 32*b* of the second projection 32. The amount of lifting of the lip edge 22*a* from the rotary shaft due to the first projection 31 and the second projection 32 corresponds to the height of the first projection 31 and the second projection 32 and increases with an increase in the height of the first projection 31 and the second projection 32. Thus, in the in-use state, contact between the lip distal end portion 22 and the rotary shaft becomes even and stable with a reduction in the heights T1, T2 of the first projection 31 and the second projection 32, whereas becoming uneven and unstable with an increase in the heights T1, T2 of the first projection 31 and the second projection 32. Accordingly, the height T1, T2 of the first projection 31 and the second projection 32 are set to, for example, allow the sealing device 1 to exhibit a desired sealing performance.

In a case where the first projection 31 and the second projection 32 are parallel projections, if, due to sliding relative to the rotary shaft, the lip distal end portion 22 becomes worn and the first projection 31 and the second projection 32 partially become worn, a distance in the radial direction between each of the first projection 31 and the second projection 32 and the outer peripheral surface of the rotary shaft increase, whereby there are cases where the pumping actions of the first projection 31 and the second projection 32 deteriorate or disappear. In contrast, in a case where the first projection 31 and the second projection 32 are ship-bottom projections, even if the lip distal end portion 22 becomes worn due to sliding relative to the rotary shaft and the first projection 31 and the second projection 32 partially become worn, it is possible to reduce or prevent a change in the distance in the radial direction between each of the first projection 31 and the second projection 32 and the outer peripheral surface to the rotary shaft. Therefore, in a case where the first projection 31 and the second projection 32 are ship-bottom projections, it is possible to reduce a deterioration of the performance of the pumping actions of the first projection 31 and the second projection 32 even if the first projection 31 and the second projection 32 partially become worn.

Figure 7:
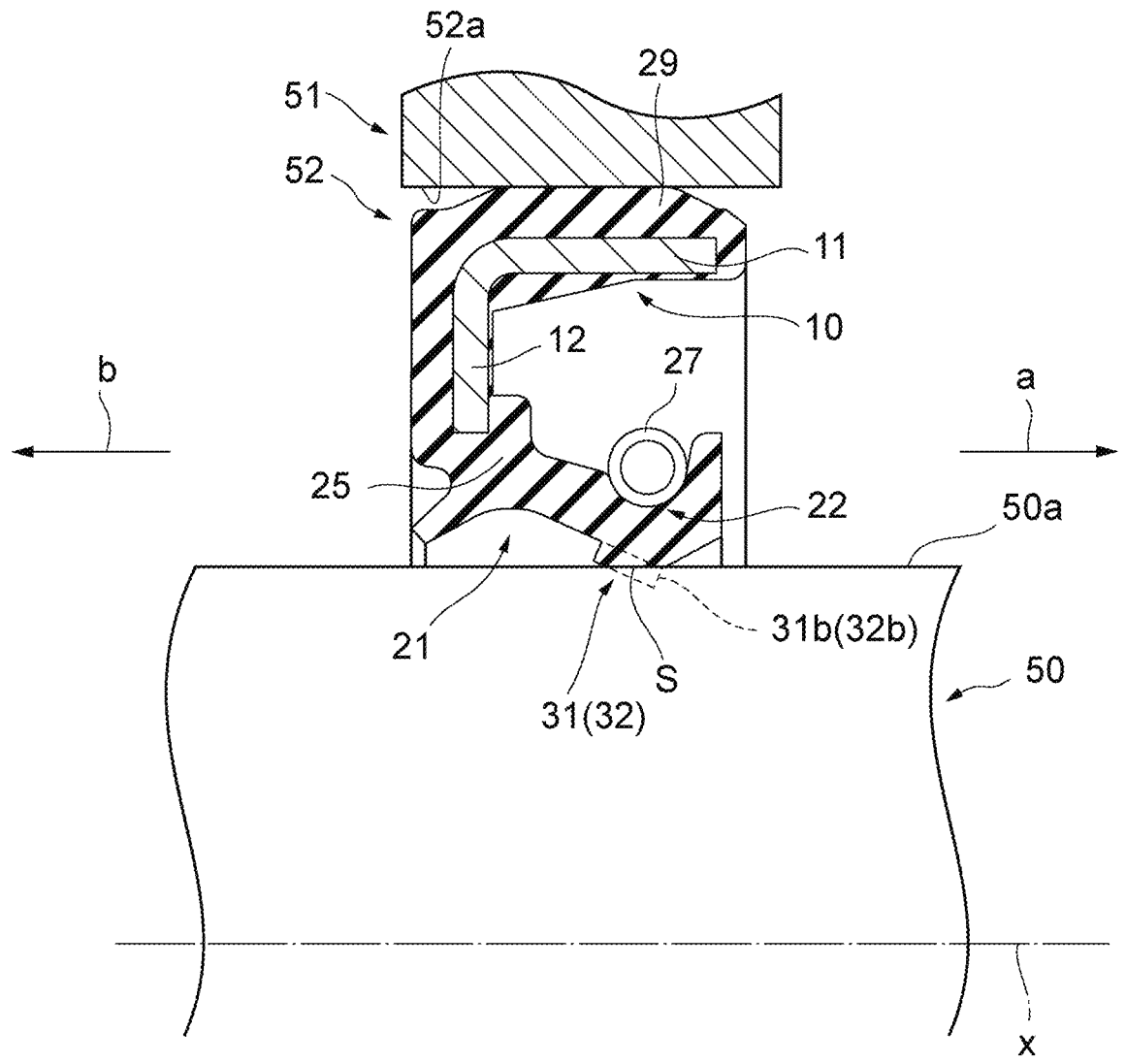
FIG. 7 is a partial cross-sectional view of assistance in explaining an in-use state of the sealing device illustrated in FIG. 1.

Next, description will be made on workings of the sealing device 1 having the above-described configuration. FIG. 7 is a partial cross-sectional view of assistance in explaining the in-use state of the sealing device 1. In order to seal a space between the rotary shaft 50 and a housing 51 having a through hole 52 through which the rotary shaft 50 penetrates, the sealing device 1 is attached in a space between the rotary shaft 50 and the through hole 52 in the in-use state. The rotary shaft 50 is, for example, an output shaft of a drive motor of an automobile and the housing 51 is, for example, a cover of the motor.

In the in-use state, the sealing device 1 is press-fitted in the through hole 52 of the housing 51 and is in contact with an inner peripheral surface 52*a* of the through hole 52 with the gasket 29 of the elastic body piece 20 compressed between the housing 51 and the reinforcing ring 10 as illustrated in FIG. 7. This causes a space between the sealing device 1 and the through hole 52 of the housing 51 to be sealed. Moreover, the lip distal end portion 22 of the seal lip 21 is in contact with an outer peripheral surface 50*a* of the rotary shaft 50 in a manner for the rotary shaft 50 to be slidable, which causes a space between the sealing device 1 and the rotary shaft 50 to be sealed. Specifically, the lip distal end portion 22 is in contact with the outer peripheral surface 50*a* of the rotary shaft 50 at a contact surface S which is a portion of a range of the lip distal end portion 22 having a width in the axis-x direction and including the lip edge 22*a*. This enables sealing of oil, as a sealed object in the sealed-object side.

Moreover, the first projection 31 and the second projection 32 of each of the projecting structures 2 are at least partly in contact with the outer peripheral surface 50*a* of the rotary shaft 50. For example, the first projection 31 and the second projection 32 are in contact with the outer peripheral surface 50*a* of the rotary shaft 50 at contact surfaces S1, S2 that are continuous from the inner ends 31*b*, 32*b*, respectively (see later-mentioned FIG. 8).

Figure 8:
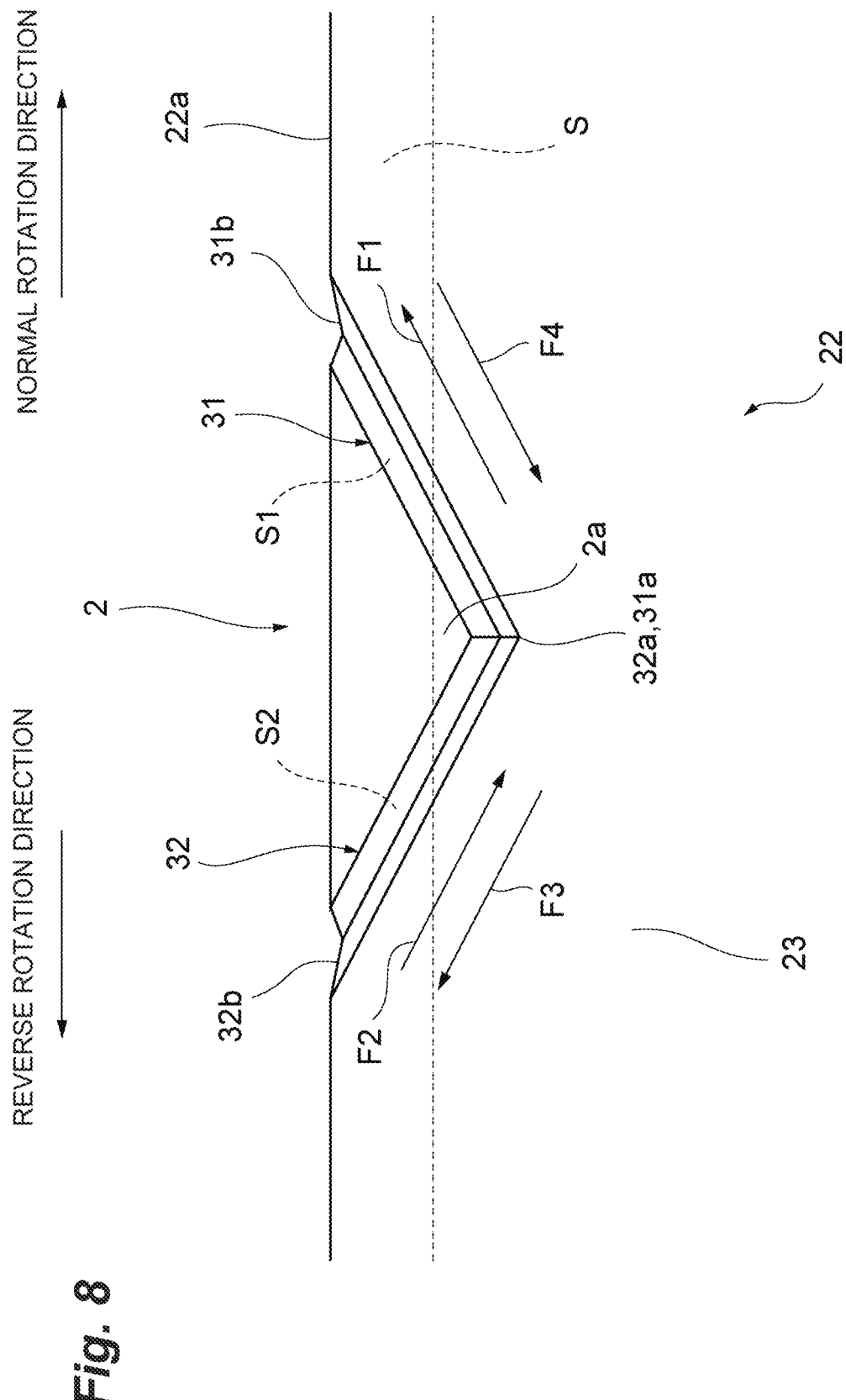
FIG. 8 is a diagram of assistance in explaining workings of a projecting structure.

FIG. 8 is a diagram of assistance in explaining workings of the projecting structure 2. FIG. 8 schematically illustrates the projecting structure 2 in a state of being in contact with the outer peripheral surface 50*a* of the rotary shaft 50. The first projection 31 of the projecting structure 2 is provided to be inclined toward the reverse rotation direction of the rotary shaft 50 as extending toward the atmosphere side. This causes an airflow F1 to be generated during a rotation of the rotary shaft 50 in the normal rotation direction in the in-use state as described above and the airflow F1 flows along the first projection 31 from the atmosphere side toward the sealed-object side as illustrated in FIG. 8. The airflow F1 enables the pumping action to return droplets of oil leaking over the contact surface S back to the sealed-object side from the atmosphere side. The droplets of oil leaking into the atmosphere side over the contact surface S of the lip distal end portion 22 are thus pushed back to the sealed-object side over the contact surface S by the pumping action of the first projection 31.

In contrast, the second projection 32 of the projecting structure 2 is provided to be inclined toward the normal rotation direction of the rotary shaft 50 as extending toward the atmosphere side. This causes an airflow F2 to be generated during a rotation of the rotary shaft 50 in the normal rotation direction in the in-use state as described above and the airflow F2 flows along the second projection 32 from the sealed-object side toward the atmosphere side as illustrated in FIG. 8. There are cases where droplets of oil are discharged from the sealed-object side into the atmosphere side due to the airflow F2. Here, in the projecting structure 2, the first projection 31 exerts the pumping action to return droplets of oil back to the sealed-object side during a rotation of the rotary shaft 50 in the normal rotation direction and the first projection 31 is connected to the second projection 32 downstream of the airflow F2 generated by the second projection 32. This causes the droplets of oil discharged from the sealed-object side into the atmosphere side due to the airflow F2 to be pushed back to the sealed-object side by virtue of the pumping action of the first projection 31.

As seen from the above, the projecting structure 2 makes it possible to return not only the droplets of oil leaking into the atmosphere side over the contact surface S of the lip distal end portion 22 but also the droplets of oil discharged into the atmosphere side due to the second projection 32 back to the sealed-object side by virtue of the first projection 31 during a rotation of the rotary shaft 50 in the normal rotation direction. The amount of the oil droplets discharged into the atmosphere side due to the second projection 32 increases with an increase in the number of rotations of the rotary shaft 50. The projecting structure 2 makes it possible to return the oil droplets discharged into the atmosphere side due to the second projection 32 back to the sealed-object side by virtue of the first projection 31 as described above. The projecting structure 2 thus makes it possible to reduce or prevent leakage of the oil even during a high-speed rotation of the rotary shaft 50 in the normal rotation direction. As seen from the above, the sealing device 1 makes it possible to reduce or prevent leakage of the oil even during a high-speed rotation of the rotary shaft 50 in the normal rotation direction. The sealing device 1 makes it possible to reduce or prevent leakage of the oil even during, for example, a high-speed rotation of the rotary shaft 50 in the normal rotation direction at a circumferential speed of 50 m/s.

In contrast, in the in-use state as described above, the first projection 31 and the second projection 32 work during a rotation of the rotary shaft 50 in the reverse rotation direction inversely to during a rotation in the normal rotation direction as illustrated in FIG. 8. The projecting structure 2 thus makes it possible to reduce or prevent leakage of the oil in the same manner as during a rotation in the normal rotation direction.

That is to say, during a rotation of the rotary shaft 50 in the reverse rotation direction, an airflow F3 is generated and the airflow F3 flows along second projection 32 from the atmosphere side toward the sealed-object side. The airflow F3 enables the pumping action to return droplets of oil back to the sealed-object side from the atmosphere side. The droplets of oil leaking into the atmosphere side over the contact surface S of the lip distal end portion 22 are thus pushed back to the sealed-object side over the contact surface S by virtue of the pumping action of the second projection 32.

In contrast, the first projection 31 of the projecting structure 2 generates an airflow F4 flowing along the first projection 31 from the sealed-object side toward the atmosphere side as illustrated in FIG. 8. There are cases where droplets of oil are discharged from the sealed-object side into the atmosphere side due to the airflow F4. Here, in the projecting structure 2, the second projection 32 exerts the pumping action to return droplets of oil back to the sealed-object side during a rotation of the rotary shaft 50 in the reverse rotation direction and the second projection 32 is connected to the first projection 31 downstream of the airflow F4 generated by the first projection 31, so that the droplets of oil discharged from the sealed-object side into the atmosphere side due to the airflow F4 are pushed back to the sealed-object side by virtue of the pumping action of the second projection 32.

As seen from the above, the projecting structure 2 makes it possible to return not only the droplets of oil leaking into the atmosphere side over the contact surface S of the lip distal end portion 22 but also the droplets of oil discharged into the atmosphere side due to the first projection 31 back to the sealed-object side by virtue of the second projection 32 during a rotation of the rotary shaft 50 in the reverse rotation direction. The projecting structure 2 thus makes it possible to reduce or prevent leakage of the oil even during a high-speed rotation of the rotary shaft 50 in the reverse rotation direction. As seen from the above, the sealing device 1 makes it possible to reduce or prevent leakage of the oil even during a high-speed rotation of the rotary shaft 50 in the reverse rotation direction. The sealing device 1 makes it possible to reduce or prevent leakage of the oil even during, for example, a high-speed rotation of the rotary shaft 50 in the reverse rotation direction at a circumferential speed of 50 m/s.

Moreover, the first projection 31 and the second projection 32 of the projecting structure 2 are connected on the atmosphere side to form a V-shaped projection and a space 2a closed on the atmosphere side is formed by the first projection 31 and the second projection 32 as illustrated in FIG. 8. This makes it possible for the projecting structure 2 to hold back droplets of oil leaking into the atmosphere side over the contact surface S and retain the droplets of oil in the space 2a, thus functioning as a weir for droplets of oil leaking into the atmosphere side. The projecting structure 2 also makes it possible to return the oil retained in the space 2a back to the sealed-object side over the contact surface S by virtue of the pumping action of the airflow F1 or the airflow F3. This working of the projecting structure 2 also makes it possible to reduce or prevent leakage of the oil.

As described above, the sealing device 1 according to the first embodiment of the present disclosure makes it possible to reduce leakage of a sealed object even though used on the rotary shaft 50 that rotates in both the normal rotation direction and the reverse rotation direction at high speed. It should be noted that although the oil as the sealed object, leaks in the form of droplets by way of example in the above description, this is merely an example of the leaking form of the sealed object and the leaking form of the sealed object is not limited to the form of droplets. Regarding the leaking form of the sealed object, the sealed object may leak from the contact surface S, for example, in an oozing manner.

It should be noted that the first projection 31 and the second projection 32 of the projecting structure 2 are not necessarily connected to each other on the atmosphere side as long as the first projection 31 pushes the droplets of oil discharged into the atmosphere side over the contact surface S due to the second projection 32 back to the sealed-object side during a rotation of the rotary shaft 50 in the normal rotation direction and the second projection 32 pushes the droplets of oil discharged into the atmosphere side over the contact surface S due to the first projection 31 back to the sealed-object side during a rotation of the rotary shaft 50 in the reverse rotation direction as described above.

Figure 9:
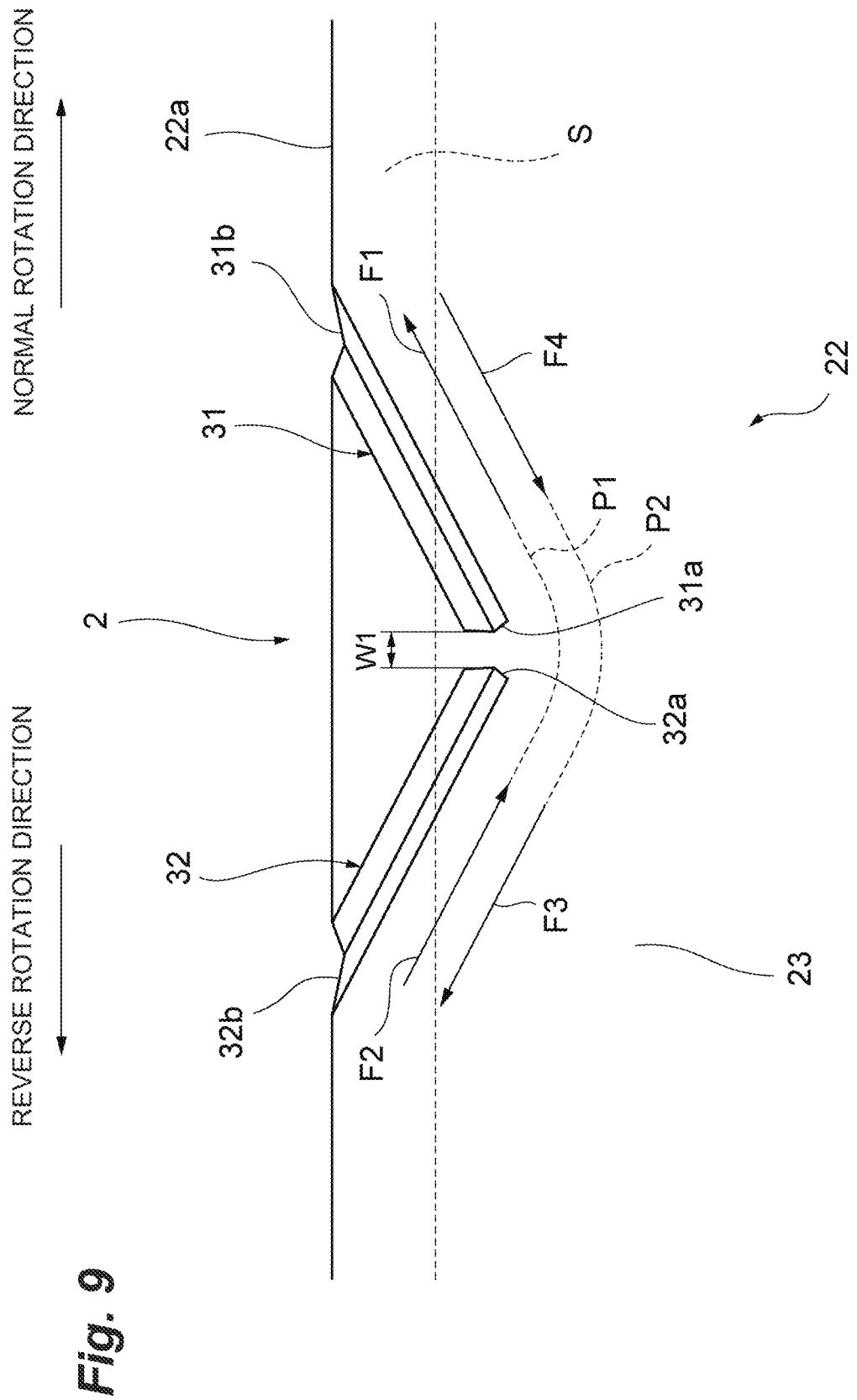
FIG. 9 is a diagram illustrating a modification example of the projecting structure.

FIG. 9 is a diagram illustrating a modification example of the projecting structure 2. As illustrated in FIG. 9, the outer end 31a of the first projection 31 may be spaced from the outer end 32a of the second projection 32 in the circumferential direction. In this case, in each of the projecting structures 2, a width W1 in the circumferential direction between the outer end 31a of the first projection 31 and the outer end 32a of the second projection 32 is narrower than, for example, a width W2 (see FIG. 3) in the circumferential direction between two of the projecting structures 2 adjacent to each other in the circumferential direction. Specifically, for example, the width W1 between the outer end 31a and the outer end 32a is a width which is able to form flow paths P1, P2 between the first projection 31 and the second projection 32 during a rotation of the rotary shaft 50 in the normal rotation direction or the reverse rotation direction and leaking oil is to be returned to the sealed-object side through the flow paths P1, P2. The flow path P1 for leaking oil to be returned to the sealed-object side is a flow path for oil discharged due to the airflow F2 to be returned to the sealed-object side by the airflow F1, a flow path in which a flow path formed by the airflow F2 is connected to a flow path formed by the airflow F1, as illustrated in, for example, FIG. 9. Moreover, the flow path P2 for oil to be returned to the sealed-object side is a flow path for oil discharged due to the airflow F4 to be returned to the sealed-object side by the airflow F3, a flow path in which a flow path formed by the airflow F4 is connected to a flow path formed by the airflow F3, as illustrated in, for example, FIG. 9.

Figure 10:
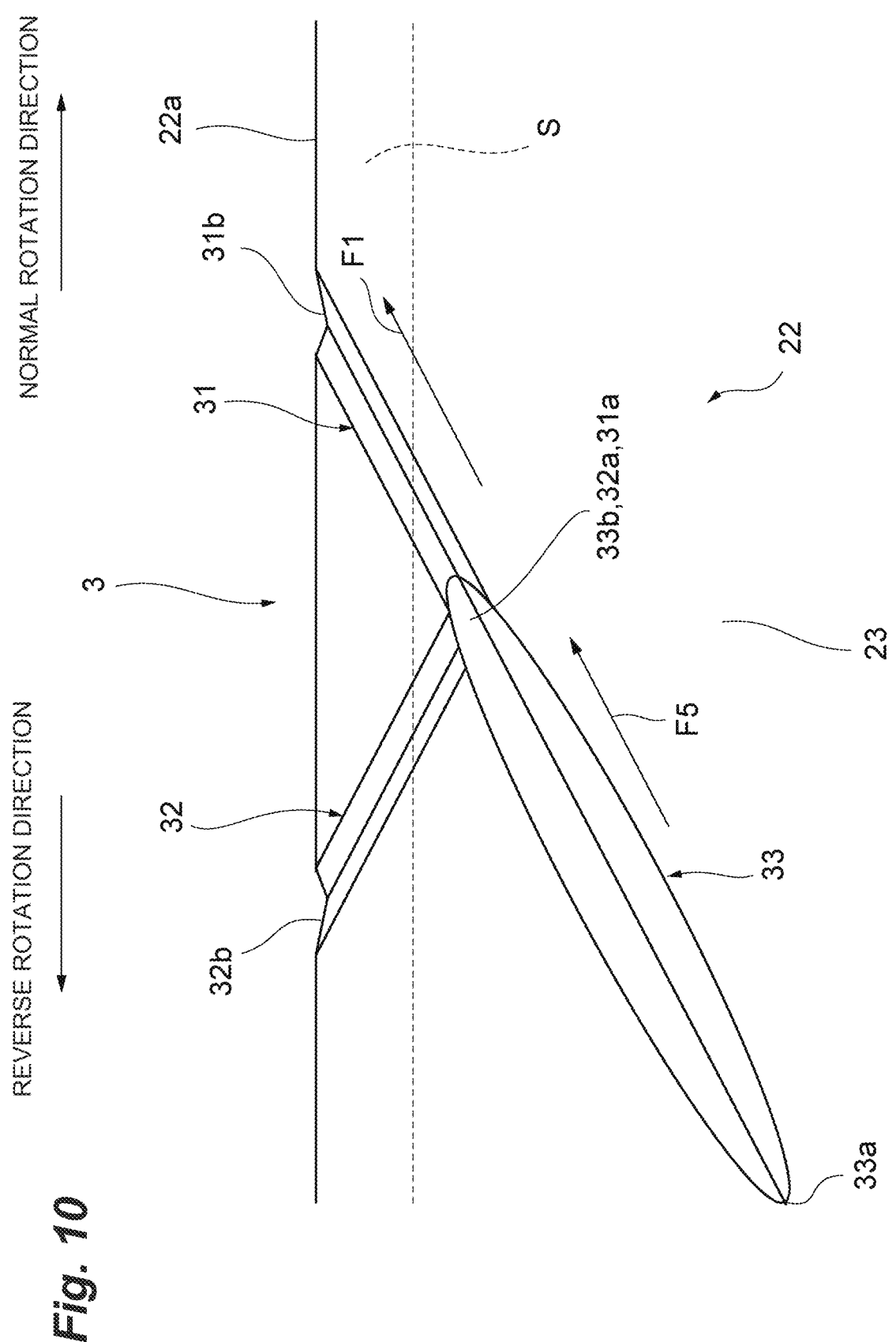
FIG. 10 is a diagram illustrating a projecting structure according to another modification example of the projecting structure.
Figure 11:
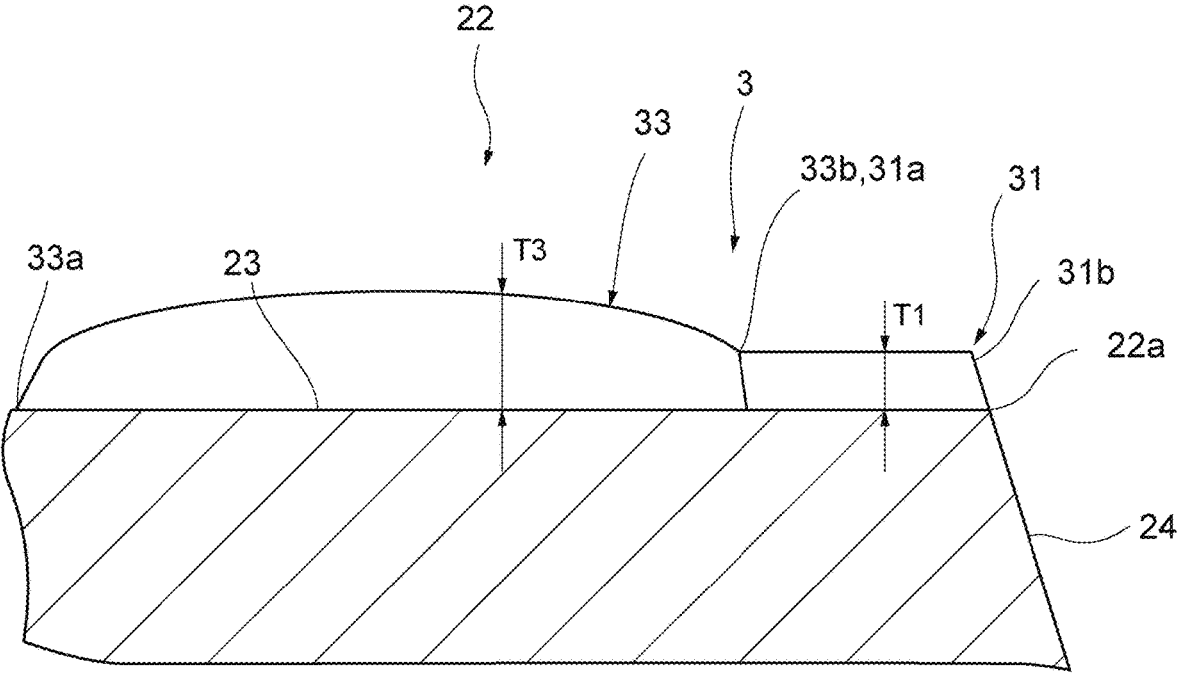
FIG. 11 is a diagram illustrating a projecting structure according to still another modification example of the projecting structure.

Next, description will be made on another modification example of the projecting structure 2. FIGS. 10 and 11 are diagrams illustrating a projecting structure 3 according to another modification example of the projecting structure 2. FIG. 10 is the diagram in which the projecting structure 3 is viewed from the inner peripheral side and FIG. 11 is the diagram in which the projecting structure 3 is viewed in the circumferential direction. As illustrated in FIG. 10, the projecting structure 3 includes a ship-bottom projection, namely, third projection 33, in addition to the first projection 31 and the second projection 32 of the projecting structure 2. The third projection 33 is located on the atmosphere side of the first projection 31 and the second projection 32. The third projection 33 is integrally connected to the first projection 31 and the second projection 32. Specifically, the third projection 33 is connected to the outer end 31a of the first projection 31 and extends along the first projection 31 toward the atmosphere side as illustrated in FIG. 10. The third projection 33 extends, for example, in parallel or substantially in parallel with the first projection 31.

As illustrated in FIG. 11, a height T3 of the third projection 33, or ship-bottom projection, is higher than the height T1 of the first projection 31, and increases from an inner end 33b toward an outer end 33a to a predetermined position and decreases from the predetermined position. It should be noted that the outer end 33a of the third projection 33 is an end on the sealed-object side of the third projection 33 and the inner end 33b of the third projection 33 is an end on the atmosphere side of the third projection 33 of the third projection 33. Moreover, a cross-sectional shape of the third projection 33 is similar to the cross-sectional shape of the first projection 31.

Similarly to the first projection 31, the third projection 33 generates an airflow F5 during a rotation of the rotary shaft 50 in the normal rotation direction to exert a pumping action. The airflow F5 flows along the third projection 33 from the atmosphere side toward the sealed-object side. Moreover, the third projection 33 is located on the atmosphere side in the axis-x direction with respect to the first projection 31 and the atmosphere-side surface 23 of the lip distal end portion 22 has a larger diameter as extending toward the atmosphere side in the axis-x direction. Thus, when the lip distal end portion 22 becomes worn and then the contact surface S overlaps the third projection 33, the third projection 33 comes into contact with the outer peripheral surface 50a of the rotary shaft 50 over a width in the axis-x direction. Thus, even though the lip distal end portion 22 becomes worn and the first projection 31 and the second projection 32 become worn, the third projection 33 comes into contact with the outer peripheral surface 50a of the rotary shaft 50 to continuously exert the pumping action to return leaking oil to the sealed-object side from the atmosphere side over the contact surface S during a rotation of the rotary shaft 50 in the normal rotation direction. As seen from the above, the projecting structure 3 makes it possible to improve the performance of the pumping action of the projecting structure 2. The projecting structure 3 also allows the pumping action to last for a long time with respect to progression of wear of the lip distal end portion 22.

Figure 12:
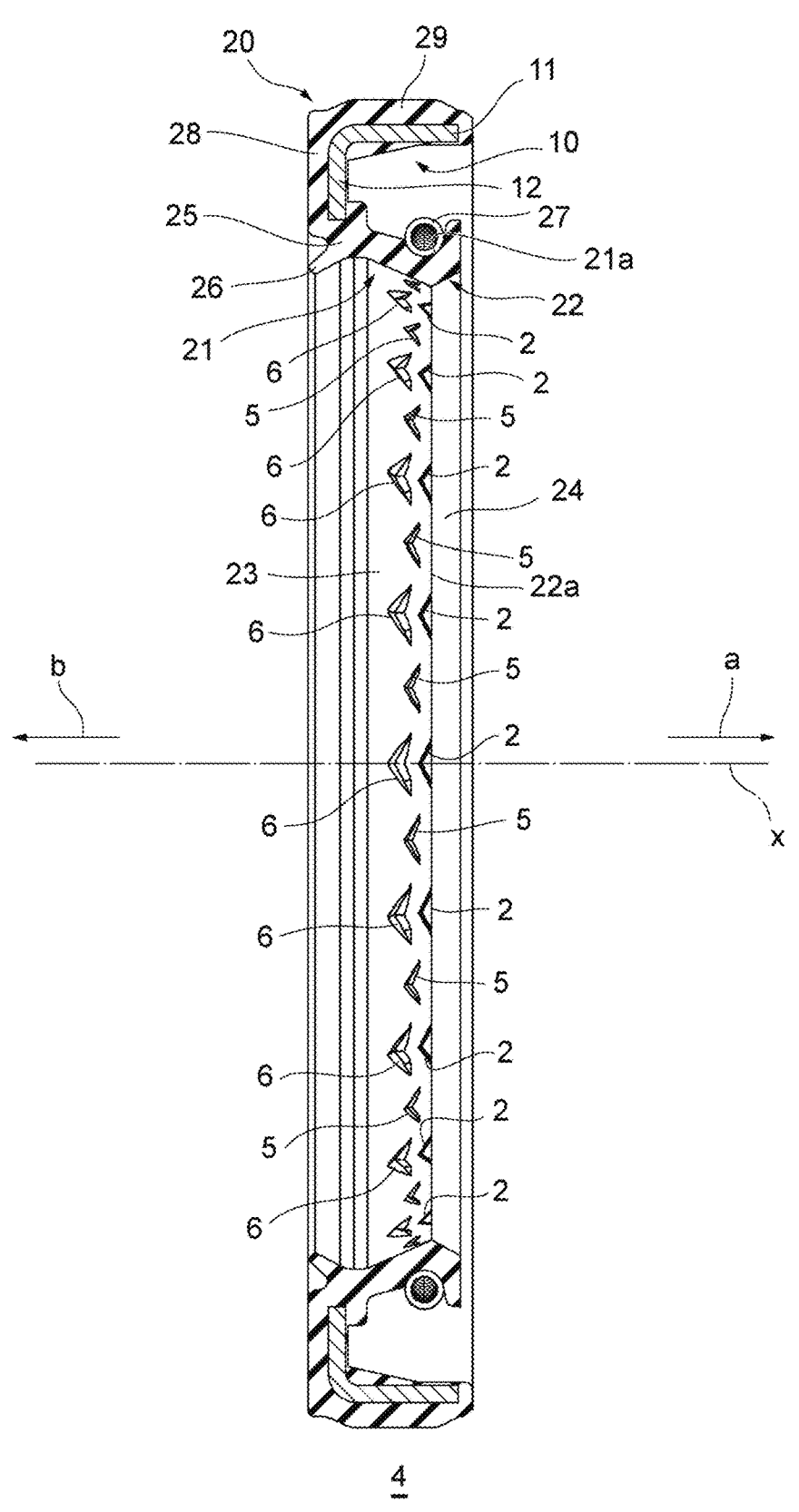
FIG. 12 is a cross-sectional view of a schematic configuration of a sealing device according to a second embodiment of the present disclosure.
Figure 13:
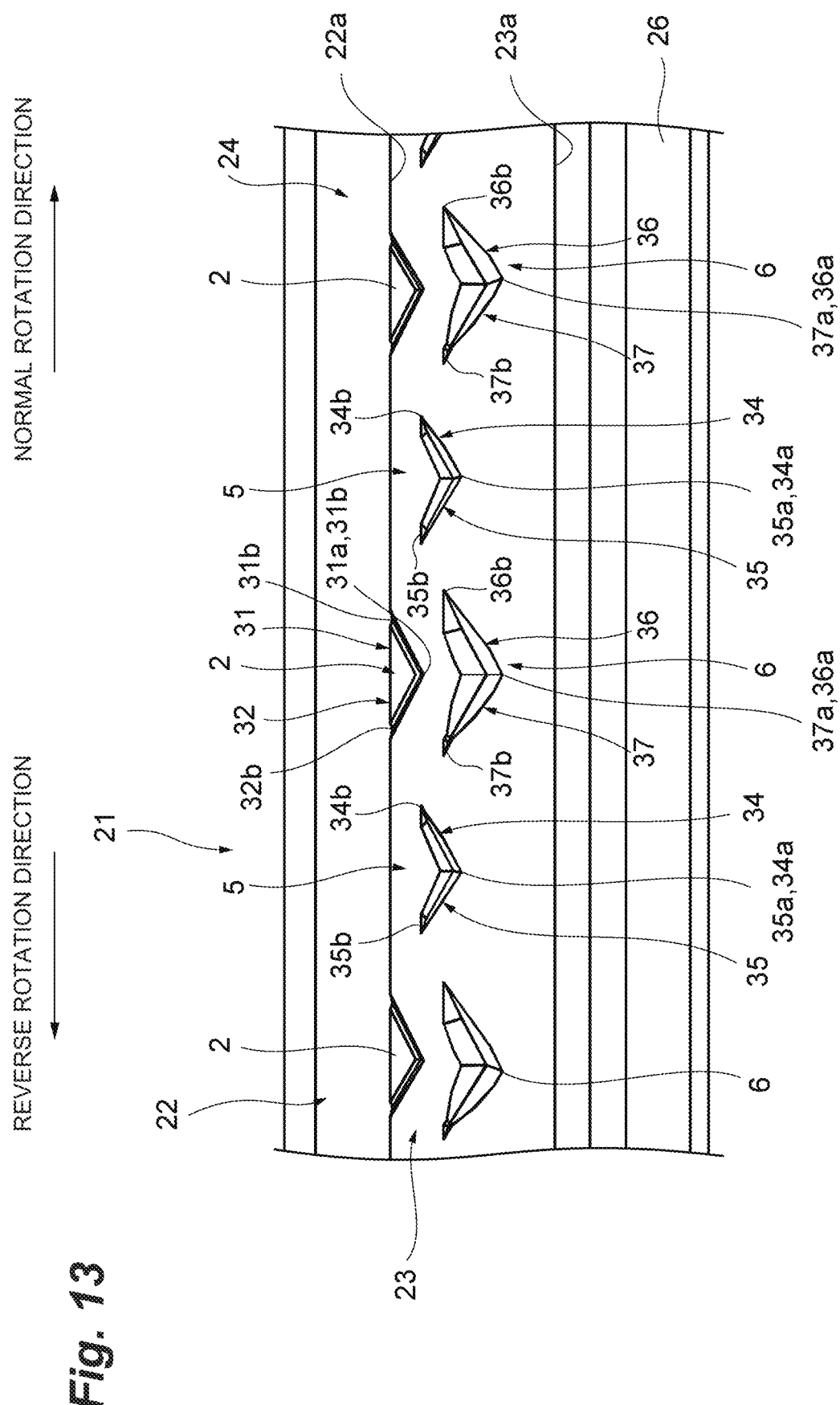
FIG. 13 is a partial enlarged view of the sealing device illustrated in FIG. 12.

Next, description will be made on a sealing device 4 according to a second embodiment of the present disclosure. FIG. 12 is a cross-sectional view of a schematic configuration of the sealing device 4 according to the second embodiment of the present disclosure and FIG. 13 is a partial enlarged view of the sealing device 4. It should be noted that FIG. 13, which is the diagram in which the elastic body piece 20 is viewed from the inner peripheral side, illustrates the lip distal end portion 22 and a nearby part. The sealing device 4 is different from the above-described sealing device 1 in that the sealing device 4 includes, as projecting structures, projecting structures of a plurality of types. Hereinbelow, out of components of the sealing device 4, description on a component that is the same as or functionally similar to that of the sealing device 1 is omitted and a different component is described.

As illustrated in FIG. 12, the projecting structures of the sealing device 4 include three types of projecting structures. That is to say, the sealing device 4 includes, as the projecting structures, a plurality of first projecting structures 2, a plurality of second projecting structures 5, and a plurality of third projecting structures 6. The plurality of first projecting structures 2 are the plurality of projecting structures 2 of the above-described sealing device 1.

The second projecting structures 5 and the third projecting structures 6 have the same or a similar shape as the first projecting structures 2 and work similarly to the projecting structures 2 of the above-described sealing device 1 when being in contact with the outer peripheral surface 50a of the rotary shaft 50. For example, when the contact surface S overlaps the second projecting structures 5 or the third projecting structures 6 due to wear of the lip distal end portion 22, the second projecting structures 5 or the third projecting structures 6 come into contact with the outer peripheral surface 50a of the rotary shaft 50.

As illustrated in FIGS. 12 and 13, the plurality of second projecting structures 5 are arranged side by side in the circumferential direction in the atmosphere-side surface 23 of the lip distal end portion 22 as the plurality of first projecting structures 2. As illustrated in FIGS. 12 and 13, the plurality of second projecting structures 5 are provided along, for example, a circle around the axis x at regular angular intervals or substantially at regular angular intervals around the axis x. Moreover, the plurality of second projecting structures 5 are provided with ends on the sealed-object side of the plurality of second projecting structures 5 located on the atmosphere side with respect to the ends on the sealed-object side of the plurality of first projecting structures 2, namely, the inner ends 31b of the first projections 31 and the inner ends 32b of the second projections 32, in the axis-x direction. Additionally, the plurality of second projecting structures 5 are each provided between two of the plurality of first projecting structures 2 adjacent to each other in the circumferential direction.

As illustrated in FIGS. 12 and 13, the plurality of third projecting structures 6 are also arranged side by side in the circumferential direction in the atmosphere-side surface 23 of the lip distal end portion 22 as the plurality of first projecting structures 2. As illustrated in FIGS. 12 and 13, the plurality of third projecting structures 6 are provided along, for example, a circle around the axis x at regular angular intervals or substantially at regular angular intervals around the axis x. Moreover, the plurality of third projecting structures 6 are provided with ends on the sealed-object side of the plurality of third projecting structures 6 located on the atmosphere side with respect to the ends on the sealed-object side of the plurality of second projecting structures 5 in the axis-x direction. Additionally, the plurality of third projecting structures 6 are each provided between two of the plurality of second projecting structures 5 adjacent to each other in the circumferential direction.

As illustrated in FIGS. 12 and 13, the second projecting structures 5 each include a first projection 34 and a second projection 35 that are similar in shape and function to the first projection 31 and the second projection 32 of each of the first projecting structures 2.

As illustrated in FIGS. 12 and 13, the first projection 34 is a projection projecting from the atmosphere-side surface 23, and extends from the sealed-object side toward the atmosphere side while being inclined in the reverse rotation direction. A cross-sectional shape of the first projection 34 is the same as or substantially the same as the cross-sectional shape of the first projection 31 of the first projecting structure 2 (see FIG. 4). Moreover, the first projection 34 is, by way of example, a ship-bottom projection (see FIG. 6). That is to say, a height of the first projection 34 is not constant throughout the entire first projection 34 but increases from an inner end 34b toward an outer end 34a. It should be noted that the height of the first projection 34, or ship-bottom projection, may increase from the inner end 34b toward the outer end 34a to a predetermined position and decrease from the predetermined position. Alternatively, the first projection 34 may be a parallel projection (see FIG. 5). It should be noted that the inner end 34b and the outer end 34a of the first projection 34 are an end on the sealed-object side and an end on the atmosphere side of the first projection 34, respectively. Moreover, the height of the first projection 34 is the amount of protrusion from the atmosphere-side surface 23, and a distance from the atmosphere-side surface 23 in a direction orthogonal to the atmosphere-side surface 23.

The second projection 35 is a projection extending while being inclined oppositely to the first projection 34, and has, for example, the same or substantially the same shape and size as the first projection 34. As illustrated in FIGS. 12 and 13, the second projection 35 is a projection projecting from the atmosphere-side surface 23, and extends from the sealed-object side toward the atmosphere side while being inclined in the normal rotation direction. A cross-sectional shape of the second projection 35 is the same as or substantially the same as the cross-sectional shape of the second projection 32 of the first projecting structure 2 (see FIG. 4). Moreover, the second projection 35 is, by way of example, a ship-bottom projection (see FIG. 6). That is to say, a height of the second projection 35 is not constant throughout the entire second projection 35 but increases from an inner end 35b toward an outer end 35a. It should be noted that the height of the second projection 35, or ship-bottom projection, may increase from the inner end 35b toward the outer end 35a to a predetermined position and decrease from the predetermined position. Alternatively, the second projection 35 may be a parallel projection (see FIG. 5). It should be noted that the inner end 35b and the outer end 35a of the second projection 35 are an end on the sealed-object side and an end on the atmosphere side of the second projection 35, respectively. Moreover, the height of the second projection 35 is the amount of protrusion from the atmosphere-side surface 23, a distance from the atmosphere-side surface 23 in a direction orthogonal to the atmosphere-side surface 23.

In the second projecting structure 5, the outer end 34a of the first projection 34 is connected to the outer end 35a of the second projection 35 as illustrated in FIGS. 12 and 13. That is to say, the outer end 34a of the first projection 34 overlaps the outer end 35a of the second projection 35. The second projecting structure 5 is thus a V-shaped projection.

The ends on the sealed-object side of the second projecting structure 5, namely, the inner end 34b of the first projection 34 and the inner end 35b of the second projection 35, are provided on the atmosphere side in the axis-x direction with respect to the inner end 31b of the first projection 31 and the inner end 32b of the second projection 32 of the first projecting structure 2. For example, as illustrated in FIG. 11, the inner end 34b of the first projection 34 and the inner end 35b of the second projection 35 of the second projecting structure 5 are located on the atmosphere side in the axis-x direction with respect to the inner end 31b of the first projection 31 and the inner end 32b of the second projection 32 of the first projecting structure 2 and on the sealed-object side in the axis-x direction with respect to the outer end 31a of the first projection 31 and the outer end 32a of the second projection 32 of the first projecting structure 2. It should be noted that the inner end 34b of the first projection 34 and the inner end 35b of the second projection 35 of the second projecting structure 5 may be located on the atmosphere side in the axis-x direction with respect to the outer end 31a of the first projection 31 and the outer end 32a of the second projection 32 of the first projecting structure 2.

As described above, the second projecting structure 5 is located on the atmosphere side in the axis-x direction with respect to the first projecting structure 2 and the atmosphere-side surface 23 of the lip distal end portion 22 has a larger diameter as extending toward the atmosphere side in the axis-x direction. Accordingly, in order to cause the first projection 34 and the second projection 35 to come into contact with the outer peripheral surface 50a of the rotary shaft 50 over a width in the axis-x direction when the lip distal end portion 22 becomes worn and then the contact surface S overlaps the plurality of second projecting structures 5, the height of the first projection 34 and the height of the second projection 35 of the second projecting structure 5 are set higher than the height of the first projection 31 and the height of the second projection 32 of the first projecting structure 2 as illustrated in FIG. 13.

As illustrated in FIGS. 12 and 13, the third projecting structures 6 each include a first projection 36 and a second projection 37 that are similar in shape and function to the first projection 31 and the second projection 32 of each of the first projecting structures 2 or the first projection 34 and the second projection 35 of each of the second projecting structures 5.

As illustrated in FIGS. 12 and 13, the first projection 36, is a projection projecting from the atmosphere-side surface 23, and extends from the sealed-object side toward the atmosphere side while being inclined in the reverse rotation direction. A cross-sectional shape of the first projection 36 is the same as or substantially the same as the cross-sectional shape of the first projection 31 of the first projecting structure 2 (see FIG. 4). Moreover, the first projection 36 is, by way of example, a ship-bottom projection (see FIG. 6). That is to say, a height of the first projection 36 is not constant throughout the entire first projection 36 but increases from an inner end 36b toward an outer end 36a. It should be noted that the height of the first projection 36, or ship-bottom projection, may increase from the inner end 36b toward the outer end 36a to a predetermined position and decrease from the predetermined position. Alternatively, the first projection 36 may be a parallel projection (see FIG. 5). It should be noted that the inner end 36b and the outer end 36a of the first projection 36 are an end on the sealed-object side and an end on the atmosphere side of the first projection 36, respectively. Moreover, the height of the first projection 36 is the amount of protrusion from the atmosphere-side surface 23, a distance from the atmosphere-side surface 23 in a direction orthogonal to the atmosphere-side surface 23.

The second projection 37 is a projection extending while being inclined oppositely to the first projection 36, and has, for example, the same or substantially the same shape and size as the first projection 36. As illustrated in FIGS. 12 and 13, the second projection 37 is a projection projecting from the atmosphere-side surface 23, and extends from the sealed-object side toward the atmosphere side while being inclined in the normal rotation direction. A cross-sectional shape of the second projection 37 of the first projecting structure 2 is the same as or substantially the same as the cross-sectional shape of the second projection 32 of the first projecting structure 2 (see FIG. 4). Moreover, the second projection 37 is, by way of example, a ship-bottom projection (see FIG. 6). That is to say, a height of the second projection 37 is not constant throughout the entire second projection 37 but increases from an inner end 37b toward an outer end 37a. It should be noted that the height of the second projection 37, or ship-bottom projection, may increase from the inner end 37b toward the outer end 37a to a predetermined position and decrease from the predetermined position. Alternatively, the second projection 37 may be a parallel projection (see FIG. 5). It should be noted that the inner end 37b and the outer end 37a of the second projection 37 are an end on the sealed-object side and an end on the atmosphere side of the second projection 37, respectively. It should be noted that the height of the second projection 37 is the amount of protrusion from the atmosphere-side surface 23, a distance from the atmosphere-side surface 23 in a direction orthogonal to the atmosphere-side surface 23.

In the third projecting structure 6, the outer end 36a of the first projection 36 is connected to the outer end 37a of the second projection 37 as illustrated in FIGS. 12 and 13. That is to say, the outer end 36a of the first projection 36 overlaps the outer end 37a of the second projection 37. The third projecting structure 6 is thus a V-shaped projection.

The ends on the sealed-object side of the third projecting structure 6, namely, the inner end 36b of the first projection 36 and the inner end 37b of the second projection 37, are provided on the atmosphere side in the axis-x direction with respect to the inner end 34b of the first projection 34 and the inner end 35b of the second projection 35 of the second projecting structure 5. For example, as illustrated in FIG. 13, the inner end 36b of the first projection 36 and the inner end 37b of the second projection 37 of the third projecting structure 6 are located on the atmosphere side in the axis-x direction with respect to the inner end 34b of the first projection 34 and the inner end 35b of the second projection 35 of the second projecting structure 5 and on the sealed-object side in the axis-x direction with respect to the outer end 34a of the first projection 34 and the outer end 35a of the second projection 35 of the second projecting structure 5. It should be noted that the inner end 36b of the first projection 36 and the inner end 37b of the second projection 37 of the third projecting structure 6 may be located on the atmosphere side in the axis-x direction with respect to the outer end 34a of the first projection 34 and the outer end 35a of the second projection 35 of the second projecting structure 5. Moreover, the plurality of third projecting structures 6 may be disposed to overlap the respective plurality of first projecting structures 2 as viewed in the axis-x direction as illustrated in FIGS. 12 and 13.

As described above, the third projecting structure 6 is located on the atmosphere side in the axis-x direction with respect to the second projecting structure 5 and the atmosphere-side surface 23 of the lip distal end portion 22 has a larger diameter as extending toward the atmosphere side in the axis-x direction. Accordingly, in order to cause the first projection 36 and the second projection 37 to come into contact with the outer peripheral surface 50a of the rotary shaft 50 over a width in the axis-x direction when the lip distal end portion 22 becomes worn and then the contact surface S overlaps the plurality of third projecting structures 6, the height of the first projection 36 and the height of the second projection 37 of the third projecting structure 6 are set higher than the height of the first projection 34 and the height of the second projection 35 of the second projecting structure 5 as illustrated in FIG. 13.

As described above, the sealing device 4 includes the projecting structures 2, 5, 6 of a plurality of types and the first projecting structures 2, the second projecting structures 5, and the third projecting structures 6 independently function as the projecting structures 2 of the above-described sealing device 1 in accordance with progression of wear of the lip distal end portion 22. That is to say, the second projecting structures 5 function even if the first projecting structures 2 partly or fully disappear with progression of wear of the lip distal end portion 22, and the third projecting structures 6 function even if the second projecting structures 5 partly or fully disappear with progression of wear of the lip distal end portion 22. This makes it possible for the sealing device 4 to reduce or prevent leakage of oil even during, for example, a high-speed rotation of the rotary shaft 50 in the normal rotation direction and the reverse rotation direction at a circumferential speed of 50 m/s irrespective of progression of wear of the lip distal end portion 22.

As described above, the sealing device 4 according to the second embodiment of the present disclosure makes it possible to reduce leakage of a sealed object even though used on the rotary shaft 50 that rotates in both the normal rotation direction and the reverse rotation direction at high speed.

It should be noted that the sealing device 4 does not necessarily include the third projecting structures 6. Moreover, the sealing device 4 may include, on the atmosphere side, a plurality of projecting structures in four or more rows repeated as the first projecting structures 2, the second projecting structures 5, and the third projecting structures 6.

Figure 14:
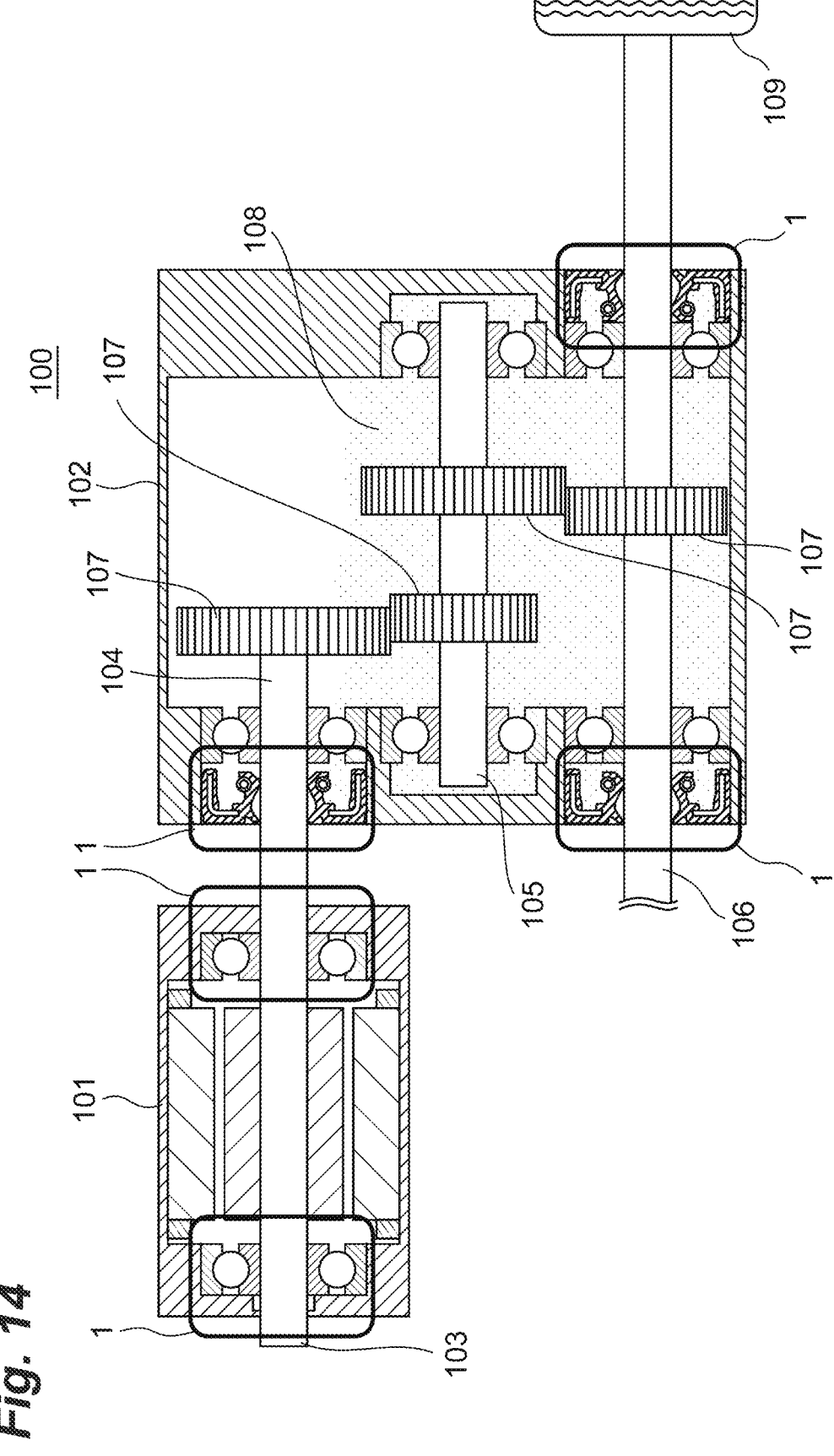
FIG. 14 is a schematic diagram illustrating an example of a drive system, i.e., an object in which the sealing device according to the present disclosure is to be used.

Next, description will be made on a drive system as an object in which the sealing device according to the present disclosure is to be used. FIG. 14 is a schematic diagram illustrating an example of the drive system as an object in which the sealing device according to the present disclosure is to be used. As illustrated in FIG. 14, an exemplary drive system 100 includes, as a drive power source, rotary equipment such as a motor 101 and a transmission 102 that outputs a rotation transferred from a drive power source side with a speed of the rotation changed. The above-described sealing device 1 or the sealing device 4 is attached to a rotary shaft of such a motor 101 or a transmission 102. The drive system 100 is, for example, a drive system in an electric vehicle.

As illustrated in FIG. 14, the drive system 100 may be exemplified by a system including the motor 101 as a drive power source and a motor shaft 103 as a power shaft, as the above-described rotary shaft 50. In the drive system 100, the sealing device 1 or the sealing device 4 is attached to a shaft hole of a housing that is a casing of the motor 101 and the sealing device 1 or the sealing device 4 is in contact with an outer peripheral surface of the motor shaft 103. The drive system 100 may also be exemplified by a system including the transmission 102 that outputs a rotation transferred from a drive power source side with a speed of the rotation changed and including, as the above-described rotary shaft 50, at least one of an input shaft 104 and an output shaft 106 of the transmission 102. Then, the sealing device 1 or the sealing device 4 is attached to a shaft hole of a housing that is a casing of the transmission 102 and the sealing device 1 or the sealing device 4 is in contact with an outer peripheral surface of the input shaft 104 and/or the output shaft 106.

A sealed object, namely, oil 108, is sealed in the housings of the motor 101 and the transmission 102 and the sealing device 1 or the sealing device 4 provided in the shaft hole of each of the motor shaft 103, the input shaft 104, and the output shaft 106 maintains liquid tightness in the corresponding housing.

It should be noted that in the transmission 102 illustrated in FIG. 14, the motor shaft 103 is coupled to the input shaft 104 of the transmission 102 and a drive force generated by the motor 101 is transferred to the transmission 102 thorough the motor shaft 103 and the input shaft 104. Moreover, the transmission 102 further includes an intermediate shaft 105 that changes a speed of the drive force transferred through the input shaft 104 and the input shaft 104, the intermediate shaft 105, the output shaft 106 drive a wheel 109 provided on the output shaft 106 through a gear 107.

The drive system as an object in which the sealing device according to the present disclosure is to be used, is not limited to a drive system in an electric vehicle and may be, for example, a drive system in an automobile other than an electric vehicle or any other type of drive system in rotary equipment other than an automobile. That is to say, the sealing device according to the present disclosure is usable in any type of drive system including a normally and reversely rotatable rotary shaft and that transfers a drive force through the rotary shaft.

In the foregoing, the present disclosure is described through the above-described embodiments but the technical scope of the present disclosure is not limited to the scope according to the above-described embodiments. It is obvious to those skilled in the art that a variety of modifications or improvements may be added to the above-described embodiments. It is obvious that embodiments to which such a modification or an improvement is added may also be within the technical scope of the present disclosure in view of the recitation of the claims.

The embodiments described hereinabove are merely for the convenience of understanding of the present disclosure and should not be considered as limiting the present disclosure. The above-described embodiments are not intended to limit an application object to which the present disclosure is to be applied and the present disclosure may accept anything as the application object. The components of the above-described embodiments and the locations, materials, conditions, shapes, sizes, and the like thereof are not limited to those described by way of example and may be changed as appropriate. For example, the present disclosure includes a difference resulting from application of a manufacturing tolerance or the like. Moreover, the components described in the different embodiments may be partially replaced or combined unless a technical inconsistency is created. Moreover, the configurations may be selectively combined as appropriate so that at least a part of the above-described problem and effects is solved or achieved.

What is claimed is:

1. A sealing device to be used on a rotary shaft that rotates in one direction and an opposite direction, the sealing device comprising:

an annular reinforcing ring around an axis; and an annular elastic body piece around the axis including a seal lip and attached to the reinforcing ring, the elastic body piece being made of an elastic body, wherein:

the seal lip includes a lip distal end portion that is an annular portion projecting toward the axis, the lip distal end portion has a sealed-side surface and an atmosphere-side surface connected to each other with a lip edge in between, the sealed-side surface being an annular surface on a sealed-object side, the atmosphere-side surface being an annular surface on an atmosphere side, the atmosphere-side surface is provided with a plurality of first projecting structures arranged side by side in a circumferential direction and a plurality of second projecting structures arranged side by side in a circumferential direction, the first projecting structures and the second projecting structures each include a first projection and a second projection adjacent to each other in the circumferential direction, the first projection is a projection for returning a sealed object leaking during a rotation of the rotary shaft in the one direction back to the sealed-object side by a pumping action, the second projection is a projection for returning the sealed object leaking during a rotation of the rotary shaft in the opposite direction back to the sealed-object side by a pumping action, in each of the first projecting structures, from the sealed-object side toward the atmosphere side, the first projection and the second projection approach each other without contacting one another such that a flow path is created through which the sealed object is to be returned to the sealed-object side during the rotation of the rotary shaft, and in each of the second projecting structures, from the sealed-object side toward the atmosphere side, the first projection and the second projection approach each other.

2. The sealing device according to claim 1, wherein the first projection of the first and second projecting structure extends from the sealed-object side toward the atmosphere side while being inclined to the opposite direction in the circumferential direction, and the second projection of the first and second projecting structure extends from the sealed-object side toward the atmosphere side while being inclined to the one direction in the circumferential direction.

3. The sealing device according to claim 1, wherein a width of the flow path in the circumferential direction between an end on the atmosphere side of the first projection and an end on the atmosphere side of the second projection in each of the first projecting structures is narrower than a width in the circumferential direction between two of the first projecting structures adjacent to each other.

4. The sealing device according to claim 1, wherein in each of the first and second projecting structures, the first projection and the second projection extend from the lip edge toward the atmosphere side.

5. The sealing device according to claim 1. wherein a height of the first projection and the second projection of each of the second projecting structures from the atmosphere-side surface is higher than a height of the first projection and second projection of each of the first projecting structures from the atmosphere-side surface.

6. The sealing device according to claim 1. further comprising a plurality of third projecting, wherein;

the third projecting structures each include a first projection and a second projection adjacent to each other in the circumferential direction, the first projection of the third projection structure is a projection for returning the sealed-object leaking during the rotation of the rotary shaft in the one direction back to the sealed-object side by a pumping action, the second projection of the third projecting structure is a projection for returning the sealed object leaking during the rotation of the rotary shaft in the opposite direction back to the sealed-object side by a pumping action, and the plurality of third projecting structures are provided in such a manner that ends on the sealed-object side of the plurality of third projecting structures are on the atmosphere side in the direction of the axis with respect to ends on the sealed-object side of the plurality of second projecting structures and the plurality of third projecting structures are each provided between, out of the plurality of second projecting structures, the second projecting structures adjacent to each other in the circumferential direction.

7. The sealing device according to claim 6, wherein a height of the first projection and second projection of each of the third projecting structures from the atmosphere-side surface is higher than a height of the first projection and second projection of each of the second projecting structures from the atmosphere-side surface.

\*    \*    \*    \*    \*